(12) United States Patent
Dharia et al.

(10) Patent No.: US 7,235,609 B2
(45) Date of Patent: Jun. 26, 2007

(54) THERMOPLASTIC OLEFIN COMPOSITIONS AND ARTICLES

(76) Inventors: Amitkumar Dharia, 387 Graham Dr., Coppell, TX (US) 75019; Jerry Wayne Rodrigue, 8503 N. Fitzgerald Way, Missouri City, TX (US) 77459

( * ) Notice: Subject to any disclaimer, the term of this patent is extended or adjusted under 35 U.S.C. 154(b) by 117 days.

(21) Appl. No.: 10/757,982

(22) Filed: Jan. 14, 2004
(Under 37 CFR 1.47)

(65) Prior Publication Data
US 2005/0154136 A1    Jul. 14, 2005

(51) Int. Cl.
*C08L 23/10* (2006.01)
*C08F 4/04* (2006.01)

(52) U.S. Cl. ............... 525/240; 525/191; 525/192; 525/232; 525/260; 526/219.6

(58) Field of Classification Search ............ 525/240, 525/191, 192, 260, 232; 526/219.6
See application file for complete search history.

(56) References Cited

U.S. PATENT DOCUMENTS

| | | | |
|---|---|---|---|
| 3,806,558 A | 4/1974 | Fischer | |
| 4,130,535 A | 12/1978 | Coran et al. | |
| 4,212,787 A | 7/1980 | Matsuda et al. | |
| 5,079,283 A | 1/1992 | Burditt et al. | |
| 5,786,403 A | 7/1998 | Okada et al. | |
| 6,166,144 A | 12/2000 | Yamaguchi et al. | |
| 6,242,525 B1 | 6/2001 | Raetzsch et al. | |
| 6,288,171 B2 | 9/2001 | Finerman et al. | |
| 6,310,140 B1 | 10/2001 | Raetzsch et al. | |
| 6,323,285 B1 * | 11/2001 | Johnston et al. | 525/242 |
| 6,503,985 B1 | 1/2003 | Ellul et al. | |
| 6,506,839 B1 | 1/2003 | Nishihara et al. | |
| 6,548,600 B2 | 4/2003 | Walton et al. | |
| 6,602,956 B2 | 8/2003 | Zhao et al. | |
| 6,620,892 B1 | 9/2003 | Bertin et al. | |
| 6,630,538 B1 | 10/2003 | Ellul et al. | |
| 6,921,792 B2 * | 7/2005 | Kim et al. | 525/236 |

* cited by examiner

*Primary Examiner*—James J. Seidleck
*Assistant Examiner*—Olga Asinovsky
(74) *Attorney, Agent, or Firm*—Tim L. Burgess

(57) ABSTRACT

A thermoplastic olefin (TPO) composition comprises (1) a major amount by weight of (a) a substantially linear homopolymer or copolymer of a $C_2$–$C_{10}$ α-olefin in major proportion to (b) a long chain branched a linear homopolymer or copolymer of a $C_2$–$C_{10}$ α-olefin, (2) a minor amount by weight of a cross linkable elastomer, and (3) at least one thermally decomposing free radical generating agent present in an amount sufficient to promote an increase in melt strength of the composition over that of the melt strength of the linear homopolymer or copolymer of a $C_2$–$C_{10}$ α-olefin alone and insufficient to substantially degrade the α-olefinic polymers. The TPO composition is prepared by melt blending the components at a temperature sufficient to melt said homopolymers or copolymers of a $C_2$–$C_{10}$ α-olefin and thermally decompose said agent. Articles are thermoformed from the thermoplastic olefin.

20 Claims, No Drawings

THERMOPLASTIC OLEFIN COMPOSITIONS AND ARTICLES

BACKGROUND OF THE INVENTION

This invention relates to thermoplastic olefins and to methods of using them to form shaped articles.

Plastics are potentially well suited for manufacture of large surface, deep parts such as automotive dash boards and bumper fascia or appliance housings such as refrigerator chests. The manufacturing method of choice for such parts is thermoforming. Thermoforming is conducted on an already fabricated product, a solid phase polymer sheet. Thermoforming is a deformation process of heating a polymer sheet until it is softened; stretching the sheet over a solid, cool mold having the desired part shape; holding the hot and flexible sheet and its edges against the contours of the mold; and allowing the sheet to cool until the sheet has rigidified so that it retains the shape and detail of the mold. Then the formed part is trimmed from its web. The trim, if substantial, must be recovered, reground and re-processed. Thermoformed products must bear the cost of the fabrication of sheet goods, and trim recovery is important in reducing the costs of sheet goods.

A key property of a polymer useful for thermoforming is its strength in the molten state ("melt strength"). Melt strength helps keep a polymeric material from tearing or excessive deformation when subjected to stress while in the melted state. Conventional polypropylene ("PP"), usually called homopolymer PP (or just "homo-PP"), has poor melt strength and relatively little melt elasticity. Heated to its melting temperature (in a range about 165° C.), it moves from a stiff-rubbery solid to a floppy, syrupy liquid in only a few degrees. In order to make PP more useful for a variety of applications, modifications have been made to it to improve melt strength and melt elasticity. The earliest such modifications focused on copolymerization with ethylenic molecules to produce ethylene-propylene ("EP") copolymers. However, while EP copolymers have superior sag resistance and good to excellent low-temperature brittleness, they have lower melting temperatures (making them unsuitable for hot environments) and they have less environmental stress crack resistance and cost more than homo-PP. Another early modification to homo-PP to improve its melt strength was the addition of fillers. Talc, calcium carbonate and titanium dioxide at dosages of 10 to 30 wt % improve stiffness at PP melt temperatures, as well as improved room temperature stiffness. But fillers do not usually alter the morphological characteristics of the polymer; and melt temperatures and glass transition temperatures of homo-PP's remain essentially unchanged by adding fillers. For example, if the unfilled homo-PP has a low temperature impact strength that is unacceptable for a given application, the filled homo-PP will also be unacceptable.

Thermoplastic olefins ("TPO's") are an alternative route to using the characteristics of homo-PP for thermoforming. TPO's are blends of olefin resin and an elastomer in which the olefins are the major continuous phase and elastomer is a minor disperse phase. These blends may be created either by melt blending or by reactor manufacture. TPO's exhibit both thermoplastic and elastomeric properties, i.e., the materials process as thermoplastics but have some physical properties possessed by elastomers.

Molding large parts without surface defects heretofore has required TPO's possessing a very high melt flow rate ("MFR") or high melt index ("MI"). Accordingly, very high MFR homo-PP is implied as the olefin resin in TPO's for such uses. However, high MFR homo-PP has low melt strength. General purpose TPO blends of homo-PP having a high MFR and olefin elastomer, mixed using either melt processing equipment such as an extruder, or in a reactor, do not have enough melt strength and drawability (extensibility or stretchability) to be shaped into large and deep parts by thermoforming. Addition of inorganic fillers does help to improve melt strengths of TPO's made with very high MFR homo-PP olefins, and such modified compositions can be drawn deeper, but they have much higher densities, making the formed parts too heavy for some applications. Alternatively, high melt strength can be achieved by resorting to TPO compositions made with olefin elastomer and very low MFR (high molecular weight) homo-PP, but these compositions have very low drawability. The inclusion of nucleating agents in TPO formulations to produce highly nucleated PP does facilitate formability but is relatively more expensive and is largely limited to small thin parts, for example, yogurt cups.

Another approach to solving melt and drawability problems of TPO's has been to modify the elastomeric component of the blend. However, using very high molecular weight elastomers or partially or fully cross-linking elastomers can improve melt strength, but at the cost of drawability, increased stiffness, and harder processability.

Thus, the most commercially available thermoplastic olefin solutions are not suitable for large size, deep drawn thermoformed articles. Further, most of the commercially available thermoplastic olefins show excessive shrinkage and loss of gloss after thermoforming. Loss of gloss is a detriment for use on many surface parts as in automobiles and appliances.

It serves understanding of this invention to distinguish thermoplastic olefins (TPO's), sometimes called "hard" thermoplastic compounds, in which the elastomeric component is not the majority component, from thermoplastic elastomers ("TPE's") and from a subset of TPE's called thermoplastic vulcanizates ("TPV's")," sometimes called "soft" thermoplastic compounds, in which the elastomeric component is the majority component. TPE's are blends of (i) olefin resins or non-olefinic resins, and (ii) olefin or non-olefinic elastomers, in which the resin is the minor component and the elastomer is the major component. Although present as the major constituent, the elastomer is intimately and uniformly dispersed as a discrete particulate phase within a continuous phase of the thermoplastic. In TPE's the elastomer may have been chemically modified (cross linked or "compatibilized"), or may be chemically modified during processing, but not to the extent that the elastomer cannot be processed by itself (that is, there is only a low level of cross-linking).

A TPV is a TPE blend of a thermoplastic resin and a cured elastomer. TPV's may be produced by dynamic vulcanization (sometimes called "DVA's," for dynamically vulcanized alloys) or by static vulcanization. Early work with vulcanized compositions is found in U.S. Pat. Nos. 3,037,954 and 3,806,558, which disclose static vulcanization as well as the technique of dynamic vulcanization, in which a vulcanizable elastomer is dispersed into a resinous thermoplastic polymer and the elastomer is cured while continuously mixing and shearing the polymer blend. The resulting composition is a microgel dispersion of cured elastomer, such as EPDM rubber, butyl rubber, chlorinated butyl rubber, polybutadiene or polyisoprene in a matrix of thermoplastic polymer such as polypropylene. Static vulcanization is a two step process. The elastomer is first mixed with thermoplastic resin, and in a second step, the elastomer is cured by irradiation or heat or a chemical reaction. Examples of TPE compositions and methods of processing such compositions, including methods of dynamic vulcanization, may be found in U.S. Pat. Nos. 4,130,534; 4,130,535; 4,311,626; 4,594,390; 5,177,147; and 5,290,886. TPE and TPV products are melt processable and can be extruded into profiles such as sheets. They also tend to exhibit high melt strength, but have very little ductility and draw, which reduces the utility of the material technology for processing applications such as thermoforming, blow molding and forming.

The elastomer used as an ingredient in TPE's and TPV's is initially in a gel state and is to be distinguished from an already thermoset elastomer, which is vulcanized to an extent that it cannot be remelted and recycled. To be recycled, a thermoset material (for example, as found in used tires) must be finely comminuted into small particles. For an example of recycled thermoset elastomers used as an ingredient blended into a thermoplastic olefin, see U.S. Pat. No. 6,573,303.

The use of organic peroxide to crosslink and cure the elastomer phase in an olefinic-based TPV is well known to those of ordinary skill in the art. For example, U.S. Pat. No. 3,758,643 discloses that peroxide 2,6-bis(t-butylperoxy)-2, 5-dimethylhexane at a concentration of 0.05 to 0.4 weight percent is useful for cross linking the elastomer phase in the olefinic TPV.

Thermoplastics, especially in polymers containing tertiary hydrogen such as polystyrene, polypropylene, polyethylene copolymers etc, but particularly polypropylene, have two types of backbone carbon-hydrogen bonds that can react: secondary and tertiary. Abstraction of hydrogen atoms from these two types of C—H bonds gives rise to secondary and tertiary carbon-centered radicals, respectively. The relevant difference between these two is that it requires substantially more energy to abstract a secondary hydrogen atom than a tertiary hydrogen atom. As a result, secondary radicals are less stable and more reactive than tertiary radicals. Organic peroxides decompose by homolysis of the O—O bond, leaving two oxygen-centered free radicals. These are energetic radicals that tend to be less discriminating in their reactions, meaning that they react more aggressively and with less selectivity, making it more difficult to control the outcome of the reaction to give the highest yield and quality of desired product. It is believed that the more energetic radicals generated from peroxides indiscriminately attack both kinds of backbone hydrogen atoms. It is further believed that $\beta$-scission of the polymer backbone (i.e., chain cleavage) occurs preferentially when secondary hydrogen atoms are abstracted, since the resulting secondary radicals are significantly less stable than tertiary radicals. Thus polymers containing secondary and tertiary hydrogen's such as polystyrene, polypropylene, polyethylene copolymers etc, but especially polypropylene, are susceptible to $\beta$-scission of the polymer backbone carbon chain (i.e., chain cleavage) due to reaction with highly energetic free radicals generated using peroxides (or from high energy radiation or at elevated temperatures). Chain scission results in lower molecular weights and higher melt flow rates. Because scission is not uniform, molecular weight distribution increases as lower molecular weight polymer chains are formed.

In the context of TPO's (containing cross linkable elastomers), not only does chain scission causes a decrease in the viscosity of the dispersing thermoplastic, but also at the same time the free radicals cause cross linking of the dispersed elastomer, which increases viscosity. Therefore if not very carefully controlled, TPO compositions formed using peroxides as free radical generators have very weak adhesion between the PP and elastomer phases, resulting in poor processability, poor surface finish, poor tear strength, and poor part dimensional stability.

Recently, as exemplified by U.S. Pat. Nos. 6,602,956 and 6,548,600, in the context of TPE's, co-agents have been employed to ameliorate the detrimental effects of peroxide free radical generating agents. In U.S. Pat. No. 6,602,956, the co-agents are metal salts of $\alpha,\beta$-unsaturated organic acids, specifically acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids, and combinations thereof, or such $\alpha,\beta$-unsaturated organic acids in which the pending acid group has been neutralized. In U.S. Pat. No. 6,548,600, the co-agents are monomers or low molecular weight polymers having two or more methacrylate, allyl or vinyl functional groups such as diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate, allyl methacrylate, N N'-m-phenylene bismaleimide, toluene bismaleimide-p-quinone dioxime, nitrobenzene, or diphenylguanidine. The co-agent solution for countering the deleterious effect of peroxide free radical generators operates, as described in U.S. Pat. No. 6,548,600, by the peroxide acting to convert the co-agent into a lower energy state, longer lasting free radical that in turn induces branching in the ethylene elastomer by hydrogen abstraction. Due to the lower energy state of this free radical, $\beta$-scissioning and disproportionation of either the polypropylene or ethylene elastomer phase is said to be less likely to occur. Additionally, the coagent is said to have the ability to act as a bridging group between the polymer chains. However, the co-agent solution has its downside. When co-agents are added to control thermoplastic chain scission caused by peroxides or other highly energetic free radicals, the resulting compositions have bad odor, darker color and higher cost.

Other approaches for improving processability or flow in TPE compositions containing polypropylene involve either a reduction in the cure state where the TPE is vulcanized, the use of a polypropylene component having a relatively high MFR, and the addition of high levels of diluent processing oil to the composition. However, while gaining improvement in processability, these solutions have yielded products having reduced tensile strength, elongation, toughness, modulus and heat distortion temperature.

Accordingly, the art has continued to search for a cost effective solution that balances processability and thermoformability of the thermoplastic composition and mechanical properties of articles formed from the compositions.

SUMMARY OF THE INVENTION

We have discovered new thermoplastic olefin (TPO) compositions having high melt processability and excellent melt stretchability that allow articles to be thermoformed that have both high stiffness and impact strength, especially low temperature impact strength, without necessarily resorting to methods populating the prior art such as using very low melt flow rate PP, high ethylene content random copolymers, high amounts of elastomer, very high Mooney viscosity elastomers, very low ethylene content elastomers, cross linking of elastomer, use of fillers such as talc, and use of difficult and costly peroxide free radical generators.

These new thermoplastic olefin compositions overcome the shortcomings of prior TPO compositions and as well other plastics that can be thermoformed such as polystyrene (PS), high impact polystyrene (HIPS), acrylonitrile butadiene styrene (ABS) or polyvinylchloride (PVC). PS based materials are more expensive, heavier, and do not have desired low temperature impact strength. Parts made of PVC are cheaper but much heavier and are environmentally less friendly. With the melt strength, extensibility and other properties of the new TPO compositions of this invention, sheets formed from the composition can be pre-heated with controllable sagging under the force of gravity and then be stretched over a thermoforming mold under vacuum without tearing, to manufacture large, deep drawn parts. The enhanced melt strength of these compositions coupled with their drawability makes them also desirable also for blow molding processes, in which molten or softened material is deformed from within by air pressure into a constraining mold. Foaming processes also benefit from melt strength, which leads to improved and even controlled bubble growth rate without premature cell collapse. The compositions of the invention produce articles that retain higher degrees of gloss and show smaller dimensional changes.

The invention comprises a new thermoplastic olefin composition, a process for preparing a thermoplastic olefin from the composition, a process for forming an article from the thermoplastic olefin, and articles formed from the thermoplastic olefin. The composition comprises (1) a major amount by weight of (a) a substantially linear homopolymer or copolymer of a C2–C10 α-olefin in major proportion to (b) a long chain branched a linear homopolymer or copolymer of a C2–C10 α-olefin, (2) a minor amount by weight of a cross linkable elastomer, and (3) at least one thermally decomposing free radical generating agent present in an amount sufficient to promote an increase in melt strength of the composition over that of the melt strength of the linear homopolymer or copolymer of a C2–C10 α-olefin alone and insufficient to substantially degrade the α-olefinic polymers, wherein the thermoplastic olefin is prepared by melt blending the components at a temperature sufficient to melt said homopolymers or copolymers of a C2–C10 α-olefin and thermally decompose said agent.

The linear homopolymer or copolymer of a $C_2$–$C_{10}$ α-olefin advantageously is substantially linear polypropylene and the long chain branched homopolymer or copolymer of a $C_2$–$C_{10}$ α-olefin advantageously is long chain branched polypropylene. The substantially linear polypropylene advantageously is included in an amount from about 20 to about 85 weight percent, the long chain branched polypropylene advantageously is included in an amount from about 5 to about 20 weight percent, and the elastomer advantageously is included in an amount from about 10 to less than a majority weight percent of the composition.

The process comprises reacting the elastomer and the thermally decomposing free radical generating agent in a melt of the linear and long chain branched $C_2$–$C_{10}$ olefin homopolymers and/or copolymers, under melt blending conditions. The melt-blending occurs at temperatures sufficient to thermally decompose the thermally decomposing free radical generating agent, resulting in the thermoplastic olefins of this invention, which have unexpectedly high impact strength at room and subzero temperatures and higher stiffness which can be extruded into thick sheet, thermoformed either via vacuum or pressure, into deep drawn parts without the loss of gloss or excessive thinning experienced in the conventional thermoplastic compositions. The long chain branched $C_2$–$C_{10}$ olefin homopolymer and/or copolymer provides required melt strength and causes enough nucleation to suppress crystallinity of the linear $C_2$–$C_{10}$ olefin homopolymer and/or copolymer resulting in higher melt strength and drawability.

The free radical generating agent for the composition advantageously is at least an azo compound of the general formula $R_1$—N=N—$R_2$ in which $R_1$ and $R_2$ can be the same or different alkane groups, for example, an azoalkane, suitably one which is an azosilane, azonitrile, or α-carbonyl azo compound, and is used in an amount not exceeding about 1.0 phr of elastomer, and suitably less than about 0.5 phr of elastomer. The use of azo compounds not only does not cause material scission of the $C_2$–$C_{10}$ olefin homopolymer and/or copolymer backbone, thus preventing a decrease in viscosity of the dispersing thermoplastic, but also it does not cause significant cross-linking of the elastomer that increases viscosity. The action of the azo compound effects depression in polymer crystallinity and hence improvement in formability. Together, the presence of long chain branched $C_2$–$C_{10}$ olefin homopolymers and/or copolymers with azo compounds as free radical generators in a composition of linear homopolymers or copolymers of $C_2$–$C_{10}$ olefins and an elastomer provides not only enhanced formability but also unexpectedly high ductility. A nucleating effect on the polymers caused by azo compounds as free radical generators in combination with the use of long chain branched $C_2$–$C_8$ olefin homopolymers and/or copolymers reduces overall size of crystalline domains and hence reduces shrinkage, warpage and surface roughness—which also implies higher gloss without use of low molecular weight elastomer. In addition, the compositions allow the use of higher melt flow rate $C_2$–$C_8$ olefin homopolymers and/or copolymers, which means lower extrusion torque, higher gloss and lower residual stresses.

DETAILED DESCRIPTION OF THE INVENTION

The major components used in preparing the thermoplastic olefins of this invention are (i) a linear homopolymer or copolymer of a $C_2$–$C_{10}$ olefin, (ii) a long chain branched homopolymer and/or copolymer of a $C_2$–$C_{10}$ olefin, (iii) an elastomer, and (iv) a free radical generating agent that is selected from substances that do not materially degrade homopolymer or copolymers of a $C_2$–$C_{10}$ olefin.

All polymers have some branching. The term "SLPO" is used herein to refer to substantially linear homopolymer or copolymer of a $C_2$–$C_{10}$ olefin, and "SLPP" is used herein to refer to substantially linear PP, both homo-PP and copolymers of PP. The term "linear" is defined herein as identifying a polymer chain which is predominantly free of long chain branching. The SLPO comprises thermoplastic polymers from the polymerization of monoolefin monomers of from 2 to 10 carbon atoms by a high pressure, low pressure, or intermediate pressure process: or by Ziegler-Natta catalysts, or by metallocene catalysts. It may have any tacticity (e.g. isotactic and syndiotactic) or may be a copolymer. The preferred monomer is propylene. Desirably the monoolefin monomers converted to repeat units are at least 99 percent propylene based on less than 1% xylene extractables. The polypropylene can be a homopolymer, a reactor copolymer polypropylene, isotactic polypropylene, syndiotactic polypropylene, and other prior art propylene copolymers. Desirably it has a melting temperature peak of at least 160° C., suitably about 165° C., and a heat of fusion of greater than 65 J/g (the $H_m$ for commercial polypropylene normally is about 70–80 J/g, measured at 10° C./minute heating and cooling rate and taken from the second heating cycle). SLPO's may be used that have nominal melt flow rates of from about 0.5 to about 12 or higher g/10 minutes at 230° C., preferably from about 0.5 to about 4 g/10 minutes at 230° C., and more preferably from about 1 to 2.5 g/10 minutes at 230° C. Most preferably the SLPO will have a melt flow rate close to that of the LCBPO, for example, suitably both could have a melt flow rate of about 3 g/10 minutes at 230° C.

The term "LCBPO" is used herein to refer to long chain branched homopolymer or copolymer of a $C_2$–$C_{10}$ olefin, and LCBPP is used herein to refer to long chain branched polypropylene. "Long chain branched" or "long chain branching" herein characterizes branching within polymeric structures which exceeds short branch lengths of pendant groups derived from individual α-olefin comonomers. Preferred LCBPO are high density polyethylene and polypropylene homopolymers and copolymers. A long chain branch of polypropylene or polyethylene should have at least a sufficient number of carbon atoms to provide significant modifications in rheological behavior, as measured by melt strength or melt tension, such as caused by chain entanglement. The minimum number of carbon atoms in a long chain branch is usually greater than about 100. Short chain branching introduced through comonomer polymerization provides branch lengths of usually less than about 10 carbon atoms per branch. The LCBPO is preferably formed from propylene and more preferably is LCBPP. Desirably the monoolefin monomers converted to repeat units are at least 99 percent propylene (based on xylene extractables). A suitable LCBPP is Daploy™ WB130HMS manufactured by Borealis A/S; it has an $I_{10/12}$ of about 20 and a melt tension of about 36 cN @ 190° C.

In the case of preferred LCBPP, the long chain branched propylene homopolymers and/or propylene copolymers suitably are synthesized by known free radical coupling reactions (modification of propylene homopolymers and/or propylene copolymers with ionizing radiation or thermally decomposing free radical-forming agents such as peroxides (optionally with addition of multifunctional, ethylenically unsaturated monomers). Long chain branched propylene homopolymers and/or propylene copolymers may also be synthesized by the polymer-like reaction of functionalized propylene homopolymers and/or propylene copolymers, such as propylene homopolymers and/or propylene copolymers containing acid groups and/or acid anhydride groups, with multifunctional compounds of opposite reactivity, suitably with $C_2$ to $C_{16}$ diamines and/or with $C_2$ to $C_{16}$ diols. Examples of long chain branched propylene homopolymers and/or propylene copolymers produced by polymer-like reactions are ones produced by the reaction of maleic anhydride-grafted propylene homopolymers and/or propylene copolymers with diamines or polyglycols or by the reaction of propylene homopolymers and/or propylene copolymers containing acid or acid anhydride groups with polymers containing epoxy, hydroxy or amino groups. Further, long chain branched propylene homopolymers and/or propylene copolymers may be those synthesized by the hydrolytic condensation of propylene homopolymers and/or propylene copolymers, which contain hydrolyzable silane groups.

The total of the SLPO and the LCBPO in the TPO composition of this invention is desirably from about 30 to about 85 weight percent, more desirably from about 45 to about 72, and preferably from about 57 to about 72 weight percent when based upon the total of the compounded thermoplastic olefin composition comprising the SLPO, the LCBPO and the elastomer. Desirably the elastomer is from about 10 to about 50, more desirably about 20 to about 40, and preferably from about 20 to 30 weight percent of the thermoplastic olefin composition of this invention.

The SLPO, and most preferably the SLPP, in the TPO composition of this invention is desirably from about 50 to about 90 weight percent, more desirably from about 60 to about 80, and preferably from about 70 to about 80 weight percent of the compounded thermoplastic olefin composition comprising the SLPO, the LCBPO and the elastomer.

The LCBPO, and most preferably the LCBPP, in the TPO composition of this invention is desirably from about 5 to about 20 weight percent, more desirably from about 8 to about 15 weight percent, and preferably from about 8 to about 13 weight percent of the compounded thermoplastic olefin composition comprising the SLPO, the LCBPO and the elastomer formulation of this invention.

The elastomer can be any elastomer including at least a small percentage of unsaturated double bond sites that are susceptible to cross-linking. (By characterizing the elastomer as capable of cross-linking, it is not implied that the reaction which the elastomer undergoes in the process of this invention using the composition of this invention substantially is cross-linking, only that it is possible because of unsaturated double bond sites in the elastomer). Ethylene α-olefin ("EAO") polymers are suitable as the elastomeric component of this invention and include interpolymers and diene modified interpolymers. "Interpolymer" refers to a copolymer having polymerized therein at least two monomers. It includes, for example, copolymers, terpolymers and tetrapolymers. It particularly includes a polymer prepared by polymerizing ethylene with at least one comonomer, typically an α-olefin of 3 to 20 carbon atoms ($C_3$–$C_{20}$). Illustrative α-olefins include propylene, 1-butene, 1-hexene, 4-methyl-1-pentene, 1-heptene, 1-octene and styrene. The α-olefin is desirably a $C_3$–$C_{10}$ α-olefin. Illustrative polymers include ethylene/propylene ("EP") copolymers, ethylene/butylene ("EB") copolymers, and ethylene/octene ("EO") copolymers. Preferred copolymers include EP, EB, ethylene/hexene-1 and EO polymers. Illustrative terpolymers include an ethylene/propylene/octene terpolymer as well as terpolymers of ethylene, a $C_3$–$C_{20}$ α-olefin and a diene such as dicyclopentadiene, 1,4-hexadiene, piperylene or 5-ethylidene-2-norbornene ("ENB"). Ethylene/propylene/diene modified terpolymers are conventionally referred to as "EPDM" compounds.

Suitable EPDM's including ENB have a molecular weight distribution greater than 4, a Mooney viscosity ranging from about 25 to about 100 (ML100C+4), preferably from about 55 to about 70, a low to medium ENB content of from about 0.5 to about 3 mol %, preferably from about 0.5 to about 2 mol % ENB, and an ethylene content of from about 65 to about 80%, preferably from about 60 to about 70%.

More specific EAO examples include ultra low linear density polyethylene (ULDPE) (e.g., Attane™ made by The Dow Chemical Company), homogeneously branched, linear EAO copolymers (e.g. Tafmer™ by Mitsui PetroChemicals Company Limited, and Exact™ by Exxon Chemical Company), and homogeneously branched, substantially linear EAO polymers (e.g. the Affinity™ polymers available from The Dow Chemical Company, Engage® polymers available from DuPont Dow Elastomers L.L.C., and Buna® EP copolymers available from Bayer Material Sciences. Suitable EAO polymers are the homogeneously branched linear and substantially linear ethylene copolymers with a density (measured in accordance with ASTM D-792) of from about 0.85 to about 0.92 g/cm$^3$, especially from about 0.85 to about 0.90 g/cm$^3$ and a melt index or $I_2$ (measured in accordance with ASTM D-1238 (190° C./2.16 kg weight) of from about 0.01 to about 30, preferably 0.05 to 10 g/10 min.

Free radical generating agents are employed in the melt blending process of this invention to cross link the elastomer component of the inventive composition and to graft the thermoplastic components to the elastomer. Free radical generating compounds useful in this invention are ones that do not significantly degrade the molecular weight of thermoplastics. As is described above, radicals generated from peroxide compounds tend to possess higher energy and, therefore, tend to be more aggressive and less discriminating in their reactions, attacking both secondary and tertiary backbone hydrogen atoms in polymers containing secondary and tertiary hydrogen's, such as polystyrene, polypropylene, polyethylene copolymers etc, but especially polypropylene, thereby causing β-scission of the polymer backbone preferentially when secondary hydrogen atoms are abstracted, since the resulting secondary radicals are significantly less stable than tertiary radicals. There are additional reasons for not using peroxides as free radical generators. It is well-known that organic peroxide compounds can themselves be decomposed by free radicals. Hydroperoxides, such as tert-butyl hydroperoxide, are particularly prone to radical-induced decomposition. The potential for self-induced decomposition makes peroxides shock-sensitive with the risk of explosion, presenting manufacturing plant safety issues. During TPO reactive blending, as free radicals are liberated to effect reactive blending, some of these radicals react with un-decomposed peroxide molecules, causing them to decompose prematurely. The results of premature peroxide decomposition during TPO reactive blending include off-specification product, increased tendency toward polymer backbone scission due to undesirable locally high radical concentrations, and the potential for uncontrolled peroxide decomposition leading to process upsets and possibly process safety problems.

A class of free radial generating agent which is especially useful with the invention is azo compounds. The term "azo compounds," as is familiar to those skilled in the art, refers to compounds of the general formula $R_1$—N═N—$R_2$ in which $R_1$ and $R_2$ can be the same or different organic groups. Azoalkanes are preferred.

Azoalkanes decompose by scission of the C—N bonds, liberating one molecule of nitrogen gas and two carbon-centered radicals. The thermodynamic stability of oxygen-centered radicals is less than the thermodynamic stability of carbon-centered radicals. Hence, oxygen-centered radicals, such as those generated from organic peroxides, are more energetic than carbon-centered radicals, such as those generated from azoalkanes. The less energetic radicals derived from azoalkanes are believed to more selectively abstract tertiary hydrogen atoms from the backbone. Therefore degradation of the polymer backbone is reduced significantly, qualifying azo compounds as free radical generating compounds that do not significantly degrade the molecular weight of thermoplastics used in the TPO composition of this invention.

Further, although as a compound class azoalkanes undergo thermal degradation (as do organic peroxides), they are generally not subject to radical-induced (self-induced) decomposition and are generally not shock-sensitive as are many organic peroxides. This is particularly true of the azonitriles. Hence, the chance of catastrophic decomposition of a stored azoalkane leading to fire or detonation is smaller than with most organic peroxide compounds. This enhanced product safety means that the administrative and engineering controls for safely storing and handling azoalkanes can be less stringent and burdensome than for peroxides.

In the nomenclature used herein, the term "azoalkane" includes a number of different subclasses of compounds possessing the azo functional group ($R_1$—N═N—$R_2$), including azosilanes, azonitriles, and α-carbonyl azo compounds. Azoaromatics, such as azobenzene, are not included, however.

Examples of azo compounds useful in this invention include, without limitation, the following:
  1-cyano-1-(t-butylazo)cyclohexane,
  1-(tert-amylazo)-cyclohexanecarbonitrile;
  1-(tert-butylazo)-cyclohexanecarbonitrile;
  1-(tert-butylazo)-formamide.
  1,1'-azo-bis(cyclohexanecarbonitrile);
  1,1'-azo-bis-cyclohexane nitrile,
  1,1'-azo-bis-cyclopentane nitrile,
  2-(tert-butylazo)isobutyronitrile;
  2-(tert-butylazo)-2,4-dimethylpentanenitrile;
  2-(tert-butylazo)-2-methylbutanenitrile;
  2-(tert-butylazo)-4-methoxy-2,4-dimethylpentanenitrile;
  2,2'-azobis(2,4-dimethylpentanenitrile);
  2,2'-azobis(2-acetoxypropane);
  2,2'-azobis(2-ethylpropanimidamide).2HCl;
  2,2'-azobis(2-methyl-butanenitrile);
  2,2'-azobis(isobutyronitrile);
  2,2'-azo-bis-methyl-2-methyl propionate,
  2,2'-azo-bis-2-methylpropionitrile,
  2,2'-azo-bis-cyclohexyl propionitrile,
  2-cyano-2-propylazoformamide,
  4-(tert-butylazo)-4-cyanopentanoic acid;
  4,4'-azobis(4-cyanopentanoic acid);
  azo-bis-(N,N'-diethyleneisobutyramidine),
  azodicarbonamide;
  N,N'-dichloroazodicarbonamide
  Azo dicarboxylic acid diethyl ester
  azo bis(isobutyronitrile)

Particularly preferred azoalkanes are azodicarbonamide and 1,1'-azobis(cyclohexanecarbonitrile) ("ACCN"). ACCN is a solid azoalkane and is the azo compound used in the examples set forth below.

The free radical generating compounds that do not significantly degrade the molecular weight of thermoplastics used in the TPO composition of this invention are desirably from about 0.1 to about 1.0 phr and preferably from about 0.1 to about 0.5 phr, and more preferably from about 0.2 to about 0.3 phr of the elastomer components used in the TPO composition. It should be understood that "phr" means parts per 100 parts of the elastomer components.

In accordance with this invention, an organic peroxide free radical generator is not used unless and only if it is present in combination with an azo compound, and then only if the amount of the free radical generator used is not in excess of the azo compound by more than 50%, and preferably does not exceed the amount of azo compound used. Preferably, the organic peroxide compound is used at in the range from 0.15 to 0.25 phr of elastomer. It has been discovered that acceptable (but less better results than if the azo compound is used alone) can be achieved with a peroxide compound if it is employed in combination with an azo compound. See Example 23, below. Accordingly, while peroxides are not preferred because of the handling difficulties they present, if used in combination with an azo compound, peroxides that may be used are those know in the art and include, without limitation, a series of vulcanizing and polymerization agents that contain α,α'-bis(t-butylperoxy)-diisopropylbenzene and are available from Hercules, Inc. under the trade designation VULCUP™, a series of such agents that contain dicumyl peroxide and are available from Hercules, Inc. under the trade designation Di-cup™ as well as Lupersol™ peroxides made by Elf Atochem, North America or Trigonox™ organic peroxides made by Akzo Nobel. The Lupersol™ peroxides include Lupersol™ 101 (2,5-dimethyl-2,5-di(t-butylperoxy)hexane), Lupersol™ 130 (2,5-dimethyl-2,5-di(t-butylperoxy)hexyne-3) and Lupersol™ 575 (t-amyl peroxy-2-ethylhexonate). Other suitable peroxides include 2,5-dimethyl-2,5-di-(t-butyl peroxy)hexane, di-t-butylperoxide, di-(t-amyl)peroxide, 2,5-di (t-amyl peroxy)-2,5-dimethylhexane, 2,5-di-(t-butylperoxy)-2,5-diphenylhexane, bis(alpha-methylbenzyl) peroxide, benzoyl peroxide, t-butyl perbenzoate, 3,6,9-triethyl-3,6,9-trimethyl-1,4,7-triperoxonane and bis(t-butylperoxy)-diisopropylbenzene.

The TPO compositions of this invention may be compounded with conventional additives or process aids such as thermal stabilizers, ultraviolet stabilizers, flame retardants, mineral fillers, extender or process oils, conductive fillers, nucleating agents, dispersants, plasticizers, impact modifiers, colorants, mold release agents, lubricants, antistatic agents, pigments, and the like. Suitable mineral fillers include, but are not limited to, talc, ground calcium carbonate, precipitated calcium carbonate, precipitated silica, precipitated silicates, precipitated calcium silicates, pyrogenic silica, hydrated aluminum silicate, calcined aluminosilicate, clays, mica, and wollastonite, and combinations thereof. Extender oils are often used to reduce any one or more of viscosity, hardness, modulus and cost of a composition. The most common extender oils have particular ASTM designations depending upon whether they are classified as paraffinic, naphthenic or aromatic oils. An artisan of ordinary skill in the processing of elastomers will readily recognize and be able to determine the most beneficial types of oil(s) for a given situation. The extender oils, when used, are desirably present in an amount within a range of about 10 to 80 phr of polymers, based on total composition weight.

Melt blending is a preferred method for preparing the final polymer blend of the present invention. Techniques for melt blending of a polymer with additives of all types are known to those of ordinary skill in the art and can typically be used with the present invention. Typically, in a melt blending operation useful with the present invention, the individual components of the blend are combined in a mechanical extruder or mixer, and then heated to a temperature sufficient to form a polymer melt and effect the reactive modification.

The TPO compositions of this disclosure are generally prepared by melt-mixing in any order, the SLPO, preferably SLPP, the LCBPO, preferably LCBPP, the elastomer, and other ingredients (filler, plasticizer, lubricant, stabilizer, etc.) in a mixer heated to above the melting temperature of the polypropylene thermoplastic. The optional fillers, plasticizers, additives etc., can be added at this stage or later. After sufficient molten-state mixing to form a well mixed blend, the free radical generating agent(s) are generally added. In some embodiments it is preferred to add the free radical generating agent in solution with a liquid, for example an elastomer processing oil, or in a masterbatch which is compatible with the other components. After discharge from the mixer, the blend containing elastomer and the thermoplastic can be milled, chopped, extruded, pelletized, injection-molded, or processed by any other desirable technique. It is usually desirable to allow the fillers and a portion of any plasticizer to distribute themselves in the elastomer or SLPO/LCBPO (SLPP/LCBPP) phase before the addition of free radical generating agent. Reaction caused by the free radical generating agent can occur in a few minutes or less depending on the mix temperature, shear rate, and activators present for the curative. Suitable melt blending temperatures include from about 170° C. to about 230° C.; more preferred temperatures are from about 190° C. to about 200° C. when SLPP and LCBPP are used (these latter temperatures being slightly higher than the complete melting point of PP). While the free radical generating agent can be added at any time, it is preferred to add it early in the process in order to allow longer mixing times with the SLPO/LCBPO (SLPP/LCBPP).

For the production of the composition of the present invention, there may be employed general apparatuses used for production of usual resin compositions and elastomer compositions, such as Banbury mixer, kneader, single-screw extruder and twin-screw extruder. The twin-screw extruder is preferred. The twin-screw extruder is more suitable for continuous production of the composition of the present invention by uniformly and finely dispersing the core components of the invention and further adding other components to allow the reactions caused by the free radical generating agent to take place. The polymeric SLPP, LCBPP and elastomeric components of the TPO compositions and the free radical generator are melt blended until the free radical generator is thermally decomposed. The temperature of the melt, residence time of the melt within the mixer, and the mechanical design of the mixer are several variables that affect the amount of shear to be applied to the composition during mixing. These variables can be readily selected by one of ordinary skill in the art based on the disclosure of the invention herein.

As a preferred melt extrusion method, a twin-screw extruder is used which has a length L in the die direction starting from the starting material adding portion and suitably the extruder has an L/D of 30 to 1 (D: diameter of barrel). Suitably the twin-screw extruder has a plurality of feed portions of a main feed portion and a side feed portion which differ in distance from the tip portion and has kneading parts between a plurality of the feed portions and between the tip portion and the feed portion nearer from the tip portion.

The twin-screw extruder may be a twin-screw extruder of same direction-revolving type or a twin-screw extruder of different direction-revolving type. The intermeshing of the screws may be any of non-intermeshing type, partial intermeshing type and complete intermeshing type. When a uniform resin is to be obtained at a low temperature under application of a low shearing force, a different direction-revolving and partial intermeshing type screw is preferred. When a somewhat strong kneading is required, a same direction-revolving and complete intermeshing type screw is preferred. When a further stronger kneading is required, a same direction-revolving and complete intermeshing type screw is preferred.

The novel TPO composition of the present invention may be pelletized, such as by strand pelleting or commercial underwater pelletization. In one embodiment, articles may be formed directly from the modified blends without intermediate processing steps such as pelleting or shipping. Pellets of the composition can be used to manufacture articles through conventional processing operations, such as thermoforming, that involves stretching and/or drawing. Similar industrial processes involving stretching and/or drawing include extrusions, blow molding, calendaring or foam processing. In each of these processes, the melt strength of the polymer is critical to its success, since the melted and/or softened polymer must retain its intended shape while being handled and/or cooled.

During extrusion, for example, a plastic sheet extrusion system is fed by one or more extruders feeding a sheet extrusion die. The die is typically closely followed by a roll cooling system. The resulting partially cooled sheet can be further cooled on a roller conveyor of finite length. No particular limitation is imposed on the method of extrusion, and various known methods can be employed. The process of extrusion is well known to those of ordinary skill in the art and is described in detail in, e.g., Rauwendaal, "Polymer Extrusion" (ISBN 0-19-520747-5) Hanser Publications, New York (1990).

During calendaring, a sheet is formed by passing the material through a series of heated rollers, with the gap between the last pair of heated rollers determining the thickness of the sheet. The process of calendaring is well known to those of ordinary skill in the art and is described in detail in, e.g., Bering, "SPI Plastics Engineering Handbook" (ISBN 0-442-31799-9) Van Nostrand Reinhold, New York (1991).

Thermoforming has been already described in the Background of the Invention. The process of thermoforming is well known to those of ordinary skill in the art and is described in detail in, e.g., Throne, "Thermoforming" (ISBN 0-02-947610-0) Hanser Publications, New York (1987).

During blow molding, air pressure is used to expand the melted polymer into hollow shapes. The principal advantage of this process is its ability to produce hollow shapes without having to join two or more separately molded parts. The process of blow molding is well known to those of ordinary skill in the art and is described in, e.g., detail in Rosato, "Blow Molding Handbook" (ISBN 0-19-520761-0) Hanser Publications, New York (1989).

To produce foamed articles, foaming agents can be included in the mixture. The expanding medium, or foaming agent, can include a physical foaming agent or a chemical foaming agent, or both. A physical foaming agent is a medium expanding composition that is a gas at temperatures and pressures encountered during the foam expanding step. Typically, a physical foaming agent is introduced to the polymer blend in the gaseous or liquid state and expands, for example, upon a rapid decrease in pressure. A chemical foaming agent is a compound or mixture of compounds that decompose at elevated temperatures to form one or more gases, which can be used to expand at least a portion of the polymer blend into a foam. During form processing, a structure that must hold its shape is developed from melted polymer by the use of blowing agents. U.S. Pat. No. 4,323,528, the disclosure of which is incorporated herein by reference, relates to making polyolefin foams using an accumulating extrusion process. The process comprises: 1) mixing a thermoplastic material and a blowing agent to form a polymer gel; 2) extruding the gel into a holding zone maintained at a temperature and pressure that does not allow the mixture to foam; the holding zone has a die defining an orifice opening into a zone of lower pressure at which the gel foams and an openable gate closing the die orifice; 3) periodically opening the gate; 4) substantially concurrently applying the mechanical pressure by means of a movable ram on the gel to eject it from the holding zone through the die orifice into the zone of lower pressure; and 5) allowing the ejected gel to expand to form the foam. The process of foam processing is well known to those of ordinary skill in the art and is described in detail in, e.g., Frisch, "Plastic Foams" (ISBN 0-82-471218-8) Marcel Dekker, New York (1972).

Articles of the invention that can be manufactured using these techniques include interior automotive components, such as instrument panels and bumpers; building materials; packaging materials; electronics materials; nonwoven fabrics and fibers; and the like.

EXAMPLES

In the following examples, the linear polymers in Examples 1–14, 17–23 are SLPP homopolymers ("PP" in the tables) commercially available as Profax® PP from Basell Polyolefins Company N.V. The SLPP in Examples 15–16 is Fortilene® 9300 PP from BP Amoco. The long chain branched polymer ("LCBPP" in the tables) is Daploy™ WB130HMS polypropylene from Borealis A/S. The elastomer used in the examples are ethylene-propylene interpolymer elastomers manufactured by Bayer Material Science and marketed under the trade name Buna® EP. The elastomer used in Examples 1–12 and 16–23 is Buna® 8816 which is a special grade EPDM terpolymer in which the conjugated diene is ethylidene norbornene ("ENB") and has a Mooney viscosity of 62, an ENB content of 2.8%, and an ethylene content of 65%. The Buna® EP elastomers used in Examples 24–26 are EP elastomers that have increasing molecular weights, as indicated by Mooney viscosities M70 (Example 24), M80 (Example 25) and M100 (Example 26) but have equal ethylene contents of about 47% ethylene, and negligible ENB. The Buna® 8816 is more crystalline than the Buna® EP elastomers used in Examples 24–26. The free radical generating agent used the examples is 1,1'-azobis (cyclohexanecarbonitrile) ("ACCN"), an azoalkane ("Azo" in the tables), available from Sigma-Aldrich.

The compositions in Examples 1–14 were melt blended in an APV twin screw extruder 19 mm diameter, 30:1 L/D. The temperatures at the spaced ports along the length of the extruder in examples 1–14 were 170, 190, 210, 210 and 210. The feed setting was 1, the rpm setting was 350, the feed rate was 0.75 and there were two passes through the extruder. The amount of material required was 500 gms. In Examples 15–16, an APV twin screw extruder 19 mm diameter, 25:1 L/D was used at a feed setting of 0.75/1 at 350 rpm and 2 passes. Temperatures at the spaced ports along the length of the extruder were 230, 200, 210, 201, 169. In Examples 17–20, the temperatures at the spaced ports along the length of the extruder were 210, 210, 210, 210 and 169, the other settings being the same as Examples 1–14. In Examples 21–23 the temperatures at the spaced ports along the length of the extruder were 210, 210, 190, 170 and 160, the other settings being the same as Examples 1–14 except that the feed setting was 0.7. In Examples 24–26, the conditions were temperatures at the spaced ports along the length of the extruder of 210, 210, 210, 201, 170 at 350 rpm and two passes.

The physical properties of the thermoplastic olefins produced in the examples were determined from methods identified for the particular properties as set forth below:

| Property | Units | Method |
|---|---|---|
| Melt Flow Rate, 230 C., 2.16 kg | g/10' | ASTM D 1238 |
| Specific Gravity | | ASTM D-792 |
| Tensile Strength 23 deg. C. | Psi | ASTM D-638 |
| Elongation @ Break | % | ASTM D-638 |
| Flex Modulus, Tangent | Psi | ASTM D-790 |
| Flexural Strength | Psi | ASTM D-790 |
| Notched Izod Impact Strength, 23 C. | ft-lb/in | ASTM D 256 |
| Gardner Impact Strength, 23 C., GC | lb-in | ASTM D 3029 |
| Gardner Impact Strength, −30 C., GC | lb-in | ASTM D 3029 |
| Gloss, 60 Degrees - Molded sample | % | |

Comparative Examples 1–3

As indicated in the Background of the Invention, one way to increase the melt strength of a TPO blend containing SLPP and an elastomer is to increase the molecular weight of SLPP. Examples 1–3 illustrate the effect of increasing molecular weight of SLPP on the properties of the resulting TPO melt blend and form a base line for comparing the improved properties of the invention to the properties of prior art TPO compositions. In the compositions of examples 1–3, the amount and type of elastomer and SLPP are held constant while the molecular weight of SLPP is increased, as indicated by corresponding decrease in MFR of the SLPP.

TABLE 1

Base Case: SLPP TPO

| | Example No. | | |
|---|---|---|---|
| | 1 | 2 | 3 |
| Bayer EPDM 8816 | 25 | 25 | 25 |
| Profax 6323, 12 MFR | 75 | 0 | 0 |
| Profax 6523, 3–4 MFR | 0 | 75 | 0 |
| Profax 6823 0.8 MFR | 0 | 0 | 75 |
| Daploy | 0 | 0 | 0 |
| Azo (phr of elastomer) | 0 | 0 | 0 |
| B225 | 0.1 | 0.1 | 0.1 |
| MFR, 2160 gm, 230° C. | 4 | 1.8 | 0.21 |
| MFR, 5 kg | 20.2 | 4.75 | 1.21 |
| MFR, 10 kg | 63 | 33.6 | 4.2 |
| $I_{10/12}$ | 16 | 19 | 20 |
| % torque | 30 | 45 | |
| % gloss, 85 degrees | 82 | 84 | 85 |
| tb, 50 sec, mil | 7.7 | NF | NF |
| tb, 60 sec, mil | 8 | 6.75 | tore |
| tb, 70 sec, mil | 17.2 | 18.75 | tore |
| tb, 80 sec, mil | tore | tore | tore |
| tb, 90 sec, mil | NA | tore | NA |
| Flex strength, .psi | 3601 | 3410 | 3219 |
| Flex Modulus, kpsi | 134 | 127 | 123 |
| Izod Impact strength, 23° C. | 8 | 14 | 16 |
| Izod Impact Strength, −30° C. | 1.2 | 1.68 | 2.45 |
| Tm, C. | 165.8 | 170.1 | 168.7, 126.3 |
| Hm, mJ/mg | 63.42 | 57.53 | 53.26 |
| Tc, C. | 134.9 | 130.3 | 125 |
| Hc, mJ/mg | −71.67 | −69.97 | −67.77 |

The data presented in Table 1 illustrates several important points:

First, as the molecular weight of SLPP increases, its melt strength, as indicated by increase in $I_{10/12}$, increases, but its thermformability, as indicated by the wall thickness ("tb") of thermoformed part, decreases. When very low flow rate (fractional MFR) SLPP is used, melt strength is too high and resulting TPO cannot be stretched.

Second, the increase in molecular weight of SLPP means slower and less perfect crystallization of SLPP from melt. This is indicated by heat of melting ("$H_m$") decreasing and solidification temperature ("$T_c$") decreasing as SLPP molecular weight increases in Examples 1–3

Consequently, as can be seen from Examples 1–3, the TPO compositions of the prior art made using higher molecular weight SLPP have high melt strength and high impact strength but have poor drawdown, lower stiffness, and require higher energy to make and process, making them unsuitable deep drawn, thin wall parts.

These examples serve as base case or comparative controls for the remaining examples.

Comparative Examples 4–6

The compositions of Examples 4–6 are prepared by adding identical amounts of an azo free radical generator to the control compositions of Examples 1–3.

TABLE 2

SLPP TPO modified with Azo

| | Example Nos. | | |
|---|---|---|---|
| | 4 | 5 | 6 |
| Bayer EPDM 8816 | 25 | 25 | 25 |
| Profax 6323, 12 MFR | 75 | 0 | 0 |
| Profax 6523, 3–4 MFR | 0 | 75 | |
| Profax 6823 0.8 MFR | 0 | 0 | 75 |
| Daploy | 0 | 0 | 0 |
| Azo (phr of elastomer) | 0.25 | 0.25 | 0.25 |
| B225 | 0.1 | 0.1 | 0.1 |
| MFR, 2160 gm, 230° C. | 4.9 | 1.75 | 0.31 |
| MFR, 5 kg | 24.3 | 8.7 | 1.64 |
| MFR, 10 kg | 75 | 30.67 | 5.35 |
| $I_{10/12}$ | 15 | 18 | 17 |
| % torque | 30 | 43 | 40 |
| % gloss, 85 degrees | 84 | 84 | 77.62 |
| tb, 50 sec, mil | 4, Tore | 10 | NF |
| tb, 60 sec, mil | 3, tore | 6 | Tore |
| tb, 70 sec, mil | 3, tore | 16 | tore |
| tb, 80 sec, mil | tore | 25 | tore |
| tb, 90 sec, mil | NA | Na | 26 |
| Flex strength, .psi | 3506 | 3054 | 2958 |
| Flex Modulus, kpsi | 127 | 116 | 117 |
| Izod Impact strength, 23° C. | 3 | 15 | 16 |
| Izod Impact Strength, −30° C. | 1.22 | 2 | 4.68 |
| Tm, C. | 170.2 | 170.1 | 167.5 |
| Hm, mJ/mg | 62.36 | 54.31 | 55.32 |
| Tc, C. | 124.4 | 124.8 | 125 |
| Hc, mJ/mg | −71.32 | −69.04 | −68.85 |

Table 3 below compares the compositions of Examples 4–6 with the corresponding decreasing melt flow rate (increasing molecular weight) SLPP compositions of Examples 1–3. Thus Example 4 is compared to Example 1 (high melt flow rate, low molecular weight SLPP), Example 5 is compared to Example 2 (moderate melt flow rate, moderate molecular weight SLPP) and Example 6 is compared to Example 3 (low melt flow rate, high molecular weight SLPP).

TABLE 3

Comparison of SLPP TPO Base Case with Effect of Azo Addition

| | Test No. | | | | | |
|---|---|---|---|---|---|---|
| | 1 | 4 | 2 | 5 | 3 | 6 |
| Bayer EPDM 8816 | 25 | 25 | 25 | 25 | 25 | 25 |
| Profax 6323, 12 MFR | 75 | 75 | 0 | 0 | 0 | 0 |

TABLE 3-continued

Comparison of SLPP TPO Base Case with Effect of Azo Addition

| | Test No. | | | | | |
|---|---|---|---|---|---|---|
| | 1 | 4 | 2 | 5 | 3 | 6 |
| Profax 6523, 3–4 MFR | 0 | 0 | 75 | 75 | 0 | |
| Profax 6823 0.8 MFR | 0 | 0 | 0 | 0 | 75 | 75 |
| Daploy | 0 | 0 | 0 | 0 | 0 | 0 |
| Azo (phr of elastomer) | 0 | 0.25 | 0 | 0.25 | 0 | 0.25 |
| B225 | 0.1 | 0.1 | 0.1 | 0.1 | 0.1 | 0.1 |
| MFR, 2160 gm, 230° C. | 4 | 4.9 | 1.8 | 1.75 | 0.21 | 0.31 |
| MFR, 5 kg | 20.2 | 24.3 | 4.75 | 8.7 | 1.21 | 1.64 |
| MFR, 10 kg | 63 | 75 | 33.6 | 30.67 | 4.2 | 5.35 |
| $I_{10/12}$ | 16 | 15 | 19 | 18 | 20 | 17 |
| % torque | 30 | 30 | 45 | 43 | | 40 |
| % gloss, 85 degrees | 82 | 84 | 84 | 84 | 85 | 77.62 |
| tb, 50 sec, mil | 7.7 | 4, Tore | NF | 10 | NF | NF |
| tb, 60 sec, mil | 8 | 3, tore | 6.75 | 6 | tore | Tore |
| tb, 70 sec, mil | 17.2 | 3, tore | 18.75 | 16 | tore | tore |
| tb, 80 sec, mil | tore | tore | tore | 25 | tore | tore |
| tb, 90 sec, mil | NA | NA | tore | Na | NA | 26 |
| Flex strength, .psi | 3601 | 3506 | 3410 | 3054 | 3219 | 2958 |
| Flex Modulus, kpsi | 134 | 127 | 127 | 116 | 123 | 117 |
| Izod Impact strength, 23° C. | 8 | 3 | 14 | 15 | 16 | 16 |
| Izod Impact Strength, −30° C. | 1.2 | 1.22 | 1.68 | 2 | 2.45 | 4.68 |
| Tm, ° C. | 165.8 | 170.2 | 170.1 | 170.1 | 168.7, 126.3 | 167.5 |
| Hm, mJ/mg | 63.42 | 62.36 | 57.53 | 54.31 | 53.26 | 55.32 |
| $T_c$, ° C. | 134.9 | 124.4 | 130.3 | 124.8 | 125 | 125 |
| Hc, mJ/mg | −71.67 | −71.32 | −69.97 | −69.04 | −67.77 | −68.85 |

The comparisons in Table 3 illustrate several important points.

Ordinarily, one would project that adding a free radical generator to the compositions of Examples 1, 2 and 3 would cause cross linking among the polymeric elastomer molecules of the compositions. Cross linking would significantly increase the molecular weight of the polymeric elastomer molecules, and if there were no significant β-scission of the SLPP, one would expect the melt strength of the TPO blend to increase. This was not the effect, however. Surprisingly, adding the azo free radical generator caused the melt flow rate (MFR) to increase very slightly and the melt strength ($I_{10/12}$) or melt elasticity to decrease slightly. The merely slight increase of the MFR of the composition indicates that at this low level of azo compound (0.25 phr of elastomer) the molecular weight of the elastomer does not significantly increase and does not produce any significant β-scission of the SLPP. This implies that cross linking of the elastomer was not significant at this level of azo compound.

Further, and interestingly, the solidification temperature (temperature of crystallization, or "$T_c$") decreased significantly but the enthalpy of melting ("$H_m$") remained substantially the same in all cases compared to the corresponding controls (Example 4 compared to Example 1, Example 5 compared to Example 2, and Example 6 compared to Example 3). This implies that addition of the azo free radical generator enhanced the rate of SLPP crystallization, an effect which produces smaller and fewer crystallites. The result of producing smaller and fewer crystallites is the enhanced stretchability seen in Examples 4–6.

Combining the implication of insignificant cross linking produced by the azo compound at the levels used, and the implication of smaller and fewer crystallites, it is inferred that the azo compound may be working its effect by forming a graft bridge between the PP and elastomer, reducing the size of dispersed domains of the elastomer in the TPO blend, thus giving the resulting TPO blend product its observed more elastomeric properties, including reduced product stiffness and increased low temperature impact strength. In addition, the TPO blend products of Examples 4–6 thermoform better (as indicated by wall thickness) compared to the controls, especially when comparing the TPO blends made with medium molecular weight SLPP (Example 4 vs. Example 2) and high molecular weight SLPP (Example 6 vs. Example 3).

Comparative Examples 7, 7A and 7B

Examples 7, 7A, and 7B illustrate the effect of replacing all or part of the SLPP in the base case prior art TPO blend by a polypropylene having substantial long chain branches ("LCBPP"). The basis for comparison is the moderate melt flow rate SLPP of Example 2. The results are set forth in Table 4, below, which includes the results of Example 2 for comparison.

TABLE 4

Moderate SLPP TPO Modified with LCBPP

| | Test No. | | | |
|---|---|---|---|---|
| | 2 | 7 | 7A | 7B |
| Bayer EPDM 8816 | 25 | 25 | 25 | 25 |
| Profax 6323, 12 MFR | 0 | 0 | 0 | 0 |
| Profax 6523, 3–4 MFR | 75 | 0 | 60 | 70 |
| Profax 6823 0.8 MFR | 0 | 0 | 0 | 0 |
| Daploy | 0 | 75 | 15 | 5 |
| Azo (phr of elastomer) | 0 | 0 | 0 | 0 |
| B225 | 0.1 | 0.1 | 0.1 | 0.1 |
| MFR, 2160 gm, 230° C. | 1.8 | 2.62 | 1.78 | 1.5 |
| MFR, 5 kg | 4.75 | 30.32 | 9.89 | 4.15 |
| MFR, 10 kg | 33.6 | 55 | 28.88 | 31.93 |
| $I_{10/12}$ | 19 | 21 | 16 | 21 |
| % torque | 45 | | | |
| % gloss, 85 degrees | 84 | 66 | 80 | 76 |

TABLE 4-continued

Moderate SLPP TPO Modified with LCBPP

| | Test No. | | | |
|---|---|---|---|---|
| | 2 | 7 | 7A | 7B |
| tb, 50 sec, mil | NF | 16 | 11.25 | 3.5 |
| tb, 60 sec, mil | 6.75 | 18 | 17.5 | 15 |
| tb, 70 sec, mil | 18.75 | 18 | 16 | 16.25 |
| tb, 80 sec, mil | tore | 17 | 16.25 | 15.5 |
| tb, 90 sec, mil | tore | NA | NA | NA |
| Flex strength, .psi | 3410 | 4100 | 3500 | 3164 |
| Flex Modulus, kpsi | 127 | 163.4 | 134 | 116.6 |
| Izod Impact strength, 23° C. | 14 | 8.86 | 14.12 | 15.27 |
| Izod Impact Strength, −30° C. | 1.68 | 1.41 | | 1.93 |
| Tm, ° C. | 170.1 | 170.5 | | |
| Hm, mJ/mg | 57.53 | 58.99 | | |
| Tc, ° C. | 130.3 | 126 | | |
| Hc, mJ/mg | −69.97 | −67.82 | | |

The data in Table 4 illustrates several important findings. First, in example 7, replacing all of the SLPP of Example 2 by LCBPP significantly increased melt strength ($I_{10/12}$) without a corresponding substantial decrease in melt flow rate. In comparison, examples 1–3 showed that for TPO blends using SLPP a substantial increase with melt strength coincided with a substantial decrease in melt flow rate.

Second, the composition of Example 7 thermoforms much more uniformly and retains much higher wall thickness than the composition of Example 2.

Third, the composition of Example 7 has significantly higher stiffness and lower solidification temperature.

Thus, entirely replacing SLPP with LCBPP produces better processability, higher melt strength, higher stretchability, as well as higher stiffness and low temperature impact strength.

Examples 7A and 7B illustrate that even partial replacement of SLPP by LCBPP provides compositions with much better stretchability and stiffness compared to the prior art base case TPO blend of Example 2.

Examples 8–10

Examples 8, 9 and 10 illustrate the effect of replacing part of SLPP with LCBPP in the compositions of Examples 4, 5 and 6. The data in Table 5 illustrate that when both the azo free radical generator and LCBPP are included in a TPO composition, both stiffness, and surprisingly also low temperature impact strength, improved significantly. Normally stiffness and impact strength, especially low temperature impact strength, are inversely related, and as stiffness increases, low temperature impact strength decreases, and vice versa. Indeed, this more normal effect was observed in when the base case TPO blend of Examples 1–3 was modified with an azo compound in Examples 4–6 and when the base case TPO compound of Example 2 was modified by substitution of the SLPP entirely or partially by LCBPP in Examples 7, 7A and 7B.

TABLE 5

SLPP TPO's Modified with Both LCBPP and Azo

| | Test No. | | |
|---|---|---|---|
| | 8 | 9 | 10 |
| Bayer EPDM 8816 | 25 | 25 | 25 |
| Profax 6323, 12 MFR | 60 | 0 | 0 |
| Profax 6523, 3–4 MFR | 0 | 60 | 0 |
| Profax 6823 0.8 MFR | 0 | 0 | 60 |
| Daploy | 15 | 15 | 15 |
| Azo (phr of elastomer) | 0.25 | 0.25 | 0.25 |
| B225 | 0.1 | 0.1 | 0.1 |
| MFR, 2160 gm, 230° C. | 3.45 | 1.79 | 0.29 |
| MFR, 5 kg | 18.7 | 10.23 | 0.79 |
| MFR, 10 kg | 60.57 | 34.64 | 5.2 |
| $I_{10/12}$ | 18 | 19 | 18 |
| % torque | 32 | 38 | 31 |
| % gloss, 85 degrees | 75.27 | 77.27 | 80.24 |
| tb, 50 sec, mil | 10 | NF | NF |
| tb, 60 sec, mil | 5 | 15 | tore |
| tb, 70 sec, mil | 20 | 19.5 | tore |
| tb, 80 sec, mil | 21.5 | 22 | 19 |
| tb, 90 sec, mil | NA | NA | 22 |
| Flex strength, .psi | 3637 | 3500 | 3375 |
| Flex Modulus, kpsi | 153 | 136.8 | 133 |
| Izod Impact strength, 23° C. | 11 | 14 | 15.52 |
| Izod Impact Strength, −30° C. | 1.21 | 1.82 | 6.43 |
| Tm, ° C. | 169.2 | 166.7 | 168.6 |
| Hm, mJ/mg | 60.39 | 63.44 | 55.03 |
| Tc, ° C. | 132.1, 122.8 | 132.9 | 130.9 |
| Hc, mJ/mg | −71.66 | −80.56 | 68.06 |

In Table 6, following, the properties of the high melt flow rate (low molecular weight) SLPP/LCBPP/elastomer/azo TPO composition blend of Example 8 (Table 5) are compared to the properties of the corresponding base case high melt flow rate SLPP/elastomer TPO composition blend of Example 1, the corresponding high melt flow rate SLPP/elastomer/azo TPO composition blend of Example 4, and the moderate melt flow rate LCBPP of Example 7.

TABLE 6

Comparison: High MFR SLPP TPO Modified with Both LCBPP and Azo

| | Test No. | | | |
|---|---|---|---|---|
| | 1 | 4 | 7 | 8 |
| Bayer EPDM 8816 | 25 | 25 | 25 | 25 |
| Profax 6323, 12 MFR | 75 | 75 | 0 | 60 |
| Profax 6523, 3–4 MFR | 0 | 0 | 0 | 0 |
| Profax 6823 0.8 MFR | 0 | 0 | 0 | 0 |
| Daploy | 0 | 0 | 75 | 15 |
| Azo (phr of elastomer) | 0 | 0.25 | 0 | 0.25 |
| B225 | 0.1 | 0.1 | 0.1 | 0.1 |
| MFR, 2160 gm, 230° C. | 4 | 4.9 | 2.62 | 3.45 |
| MFR, 5 kg | 20.2 | 24.3 | 30.32 | 18.7 |
| MFR, 10 kg | 63 | 75 | 55 | 60.57 |
| $I_{10/12}$ | 16 | 15 | 21 | 18 |
| % torque | 30 | 30 | | 32 |
| % gloss, 85 degrees | 82 | 84 | 66 | 75.27 |
| tb, 50 sec, mil | 7.7 | 4, Tore | 16 | 10 |
| tb, 60 sec, mil | 8 | 3, tore | 18 | 5 |
| tb, 70 sec, mil | 17.2 | 3, tore | 18 | 20 |
| tb, 80 sec, mil | tore | tore | 17 | 21.5 |
| tb, 90 sec, mil | NA | NA | NA | NA |
| Flex strength, .psi | 3601 | 3506 | 4100 | 3637 |
| Flex Modulus, kpsi | 134 | 127 | 163.4 | 153 |
| Izod Impact strength, 23° C. | 8 | 3 | 8.86 | 11 |
| Izod Impact Strength, −30° C. | 1.2 | 1.22 | 1.41 | 1.21 |
| Tm, ° C. | 165.8 | 170.2 | 170.5 | 169.2 |
| Hm, mJ/mg | 63.42 | 62.36 | 58.99 | 60.39 |

TABLE 6-continued

Comparison: High MFR SLPP TPO Modified
with Both LCBPP and Azo

| | Test No. | | | |
|---|---|---|---|---|
| | 1 | 4 | 7 | 8 |
| Tc, ° C. | 134.9 | 124.4 | 126 | 132.1, 122.8 |
| Hc, mJ/mg | −71.67 | −71.32 | −67.82 | −71.66 |

As seen from Table 6, for high melt flow rate SLPP components, the novel TPO composition of Example 8 excels in melt strength and drawability compared to the prior art TPO composition of Example 1, yet the TPO composition of Example 8 maintains high stiffness like the TPO composition of the prior art while, surprisingly, unlike the prior art TPO composition of Example 1, also achieving high impact strengths. Gloss is retained better than when no SLPP or azo is present, as in Example 7.

In Table 7, following, the properties of the moderate melt flow rate (moderate molecular weight) SLPP/LCBPP/elastomer/azo TPO composition blend of Example 9 (Table 5) are compared to the properties of the corresponding moderate melt flow rate SLPP/elastomer TPO composition blend of Example 2, the corresponding moderate melt flow rate SLPP/elastomer/azo TPO composition blend of Example 5, and the moderate melt flow rate SLPP/LCBPP/elastomer TPO composition blend of Examples 7A and 7B.

TABLE 7

Comparison: Moderate MFR SLPP TPO
Modified with Both LCBPP and Azo

| | Test No. | | | | |
|---|---|---|---|---|---|
| | 2 | 5 | 7B | 7A | 9 |
| Bayer EPDM 8816 | 25 | 25 | 25 | 25 | 25 |
| Profax 6323, 12 MFR | 0 | 0 | 0 | 0 | 0 |
| Profax 6523, 3–4 MFR | 75 | 75 | 70 | 60 | 60 |
| Profax 6823 0.8 MFR | 0 | 0 | 0 | 0 | 0 |
| Daploy | 0 | 0 | 5 | 15 | 15 |
| Azo (phr of elastomer) | 0 | 0.25 | 0 | 0 | 0.25 |
| B225 | 0.1 | 0.1 | 0.1 | 0.1 | 0.1 |
| MFR, 2160 gm, 230° C. | 1.8 | 1.75 | 1.5 | 1.78 | 1.79 |
| MFR, 5 kg | 4.75 | 8.7 | 4.15 | 9.89 | 10.23 |
| MFR, 10 kg | 33.6 | 30.67 | 31.93 | 28.88 | 34.64 |
| I$_{10/12}$ | 19 | 18 | 21 | 16 | 19 |
| % torque | 45 | 43 | | | 38 |
| % gloss, 85 degrees | 84 | 84 | 76 | 80 | 77.27 |
| tb, 50 sec, mil | NF | 10 | 3.5 | 11.25 | NF |
| tb, 60 sec, mil | 6.75 | 6 | 15 | 17.5 | 15 |
| tb, 70 sec, mil | 18.75 | 16 | 16.25 | 16 | 19.5 |
| tb, 80 sec, mil | tore | 25 | 15.5 | 16.25 | 22 |
| tb, 90 sec, mil | tore | Na | NA | NA | NA |
| Flex strength, .psi | 3410 | 3054 | 3164 | 3500 | 3500 |
| Flex Modulus, kpsi | 127 | 116 | 116.6 | 134 | 136.8 |
| Izod Impact strength, 23° C. | 14 | 15 | 15.27 | 14.12 | 14 |
| Izod Impact Strength, −30° C. | 1.68 | 2 | 1.93 | | 1.82 |
| Tm, ° C. | 170.1 | 170.1 | | | 166.7 |

TABLE 7-continued

Comparison: Moderate MFR SLPP TPO
Modified with Both LCBPP and Azo

| | Test No. | | | | |
|---|---|---|---|---|---|
| | 2 | 5 | 7B | 7A | 9 |
| Hm, mJ/mg | 57.53 | 54.31 | | | 63.44 |
| Tc, ° C. | 130.3 | 124.8 | | | 132.9 |
| Hc, mJ/mg | −69.97 | −69.04 | | | −80.56 |

As seen from Table 7, for moderate melt flow rate SLPP components, the novel TPO composition of Example 9 equals in melt strength but excels in drawability compared to the prior art TPO composition of Example 2 and compared to the LCBPP partial substitutions of SLPP for the SLPP in the prior art composition of Example 2, yet the TPO composition of Example 9 has higher stiffness than the TPO composition of the prior art and the SLPP/elastomer/azo TPO composition of Example 5, while also achieving good low temperature impact strengths.

In Table 8, following, the properties of the low melt flow rate (high molecular weight) SLPP/LCBPP/elastomer/azo TPO composition blend of example 10 (Table 5) are compared to the properties of the corresponding low melt flow rate SLPP/elastomer TPO composition blend of Example 3, the corresponding low melt flow rate SLPP/elastomer/azo TPO composition blend of Example 6, and the moderate melt flow rate SLPP/LCBPP/elastomer TPO composition blend of Example 7A.

TABLE 8

Comparison: Low MFR SLPP TPO Modified
with Both LCB-PP and Azo

| | Test No. | | | |
|---|---|---|---|---|
| | 3 | 6 | 7A | 10 |
| Bayer EPDM 8816 | 25 | 25 | 25 | 25 |
| Profax 6323, 12 MFR | 0 | 0 | 0 | 0 |
| Profax 6523, 3–4 MFR | 0 | 0 | 60 | 0 |
| Profax 6823 0.8 MFR | 75 | 75 | 0 | 60 |
| Daploy | 0 | 0 | 15 | 15 |
| Azo (phr of elastomer) | 0 | 0.25 | 0 | 0.25 |
| B225 | 0.1 | 0.1 | 0.1 | 0.1 |
| MFR, 2160 gm, 230° C. | 0.21 | 0.31 | 1.78 | 0.29 |
| MFR, 5 kg | 1.21 | 1.64 | 9.89 | 0.79 |
| MFR, 10 kg | 4.2 | 5.35 | 28.88 | 5.2 |
| I$_{10/12}$ | 20 | 17 | 16 | 18 |
| % torque | | 40 | | 31 |
| % gloss, 85 degrees | 85 | 77.62 | 80 | 80.24 |
| tb, 50 sec, mil | NF | NF | 11.25 | NF |
| tb, 60 sec, mil | tore | Tore | 17.5 | tore |
| tb, 70 sec, mil | tore | tore | 16 | tore |
| tb, 80 sec, mil | tore | tore | 16.25 | 19 |
| tb, 90 sec, mil | NA | 26 | NA | 22 |
| Flex strength, .psi | 3219 | 2958 | 3500 | 3375 |
| Flex Modulus, kpsi | 123 | 117 | 134 | 133 |
| Izod Impact strength, 23° C. | 16 | 16 | 14.12 | 15.52 |
| Izod Impact Strength, −30° C. | 2.45 | 4.68 | | 6.43 |
| Tm, ° C. | 168.7, 126.3 | 167.5 | | 168.6 |
| Hm, mJ/mg | 53.26 | 55.32 | | 55.03 |
| Tc, ° C. | 125 | 125 | | 130.9 |
| Hc, mJ/mg | −67.77 | −68.85 | | 68.06 |

As seen from Table 8, for low melt flow rate SLPP components, the TPO composition of Example 10 substantially matches the high melt strengths of the low melt flow rate SLPP TPO composition of the prior art, yet Example 10, unlike the prior art composition of Example 3, excels in drawability despite using low melt flow rate SLPP in the composition of Example 10. Further Example 10 compares favorably also to Example 6 (prior art TPO composition plus azo) and 7A (LCBPP partial substitutions of SLPP for the SLPP in the prior art composition of Example 2), yet the TPO composition of Example 10 has higher stiffness than the TPO composition of the prior art and the SLPP/elastomer/azo TPO composition of Example 5, while also achieving outstanding low temperature impact strengths.

Thus the novel TPO compositions of Examples 8–10 in which LCBPP is partially substituted for SLPP and in which an azo free radical generator is present in the blend composition, all stretched and thermoformed very well, even at higher heat soak times, compared to control compositions of the prior art, as exemplified in base case Examples 1–3, compared to Examples 4–6 in which the prior art compositions of Examples 1–3 were modified with azo free radical generator alone, and as compared to Examples 7, 7A and 7B, in which LCBPP was substituted partially or entirely for SLPP in prior art compositions.

Example 8 is of particular significance. The ability to thermoform with higher melt flow rate SLPP as part of the TPO composition is an important industrial advantage, for it allows higher throughput, lower energy consumption, better surface finish, higher hot tear strength, and better formability, which cannot be realized in conventional thermo-formability TPO's made either by using high molecular weight SLPP (low MFR) or high molecular weight elastomer (higher Mooney).

Examples 11–12

Examples 9, supra, illustrates the effect of replacing 15 weight percent of the SLPP of Example 5 with LCBPP. In Examples 11 and 12, lesser amounts of SLPP were substituted with LCBPP. The data in Table 9 illustrate that thermo-formability and stiffness improves with increasing amounts of LCBPP up to about 15% weight percent. The best results are obtained when the amount of LCBPP is greater than 5% and less than 15%.

TABLE 9

Moderate MFR SLPP TPO and Azo Modified with Increasing Amounts of LCB-PP

| | Test No. | | | |
|---|---|---|---|---|
| | 5 | 11 | 12 | 9 |
| Bayer EPDM 8816 | 25 | 25 | 25 | 25 |
| Profax 6523, 3–4 MFR | 75 | 70 | 65 | 60 |
| Daploy | 0 | 5 | 10 | 15 |
| Azo (phr of elastomer) | 0.25 | 0.25 | 0.25 | 0.25 |
| B225 | 0.1 | 0.1 | 0.1 | 0.1 |
| MFR, 2160 gm, 230° C. | 1.75 | 1.84 | 1.8 | 1.79 |
| MFR, 5 kg | 8.7 | 9.65 | 9.62 | 10.23 |
| MFR, 10 kg | 30.67 | 35.34 | 37.83 | 34.64 |
| $I_{10/12}$ | 18 | 19 | 21 | 19 |
| % torque | 43 | 35 | 35 | 38 |
| % gloss, 85 degrees | 84 | 79.54 | 74.26 | 77.27 |
| tb, 50 sec, mil | 10 | NF | 7.7 | NF |
| tb, 60 sec, mil | 6 | 2 | 5 | 15 |
| tb, 70 sec, mil | 16 | 19 | 15.75 | 19.5 |
| tb, 80 sec, mil | 25 | 19 | 20 | 22 |
| tb, 90 sec, mil | Na | NA | NA | NA |
| Flex strength, .psi | 3054 | 3361 | 3311 | 3500 |
| Flex Modulus, kpsi | 116 | 126 | 122 | 136.8 |
| Izod Impact strength, 23° C. | 15 | 14.73 | 14.84 | 14 |
| Izod Impact Strength, –30° C. | 2 | 1.75 | 1.81 | 1.82 |

TABLE 9-continued

Moderate MFR SLPP TPO and Azo Modified with Increasing Amounts of LCB-PP

| | Test No. | | | |
|---|---|---|---|---|
| | 5 | 11 | 12 | 9 |
| Tm, ° C. | 170.1 | 167.6 | 169.3 | 166.7 |
| Hm, mJ/mg | 54.31 | 63.25 | 59.03 | 63.44 |
| Tc, ° C. | 124.8 | 131.7 | 132 | 132.9 |
| Hc, mJ/mg | –69.04 | –82.8 | –69.58 | –80.56 |

In conclusion as respects the results shown for the novel TPO compositions of Examples 8–12, it can be seen that the compositions of the present invention uniquely provide good melt strength and extensibility while preserving good flex strength and good flex modulus, and surprisingly, give very good impact strengths, considering the levels of flex strength for the melt strength.

Examples 13–14

These examples investigated the effect of higher and increasing amounts of an azo free radical generator on blends of moderate melt flow rate SLPP and LCBPP in which an elastomer was absent. (These examples are not TPO compositions in that they do not contain an elastomer.)

TABLE 10

Effect of Azo on SLPP + LCBPP

| | Example No. | |
|---|---|---|
| | 13 | 14 |
| Bayer EPDM 8816 | 0 | 0 |
| Profax 6523, 3–4 MFR | 87 | 87 |
| Daploy | 13 | 13 |
| Azo (phr of elastomer) | 0.5 | 0.75 |
| B225 | 0.1 | 0.1 |
| MFR, 2160 gm, 230° C. | 2.27 | 1.99 |
| MFR, 5 kg | 10.26 | 11.03 |
| MFR, 10 kg | 35.5 | 36.11 |
| $I_{10/12}$ | 16 | 18 |
| % torque | 30 | 25 |
| % gloss, 85 degrees | 80.46 | 76.8 |
| tb, 50 sec, mil | 6.5 | tore |
| tb, 60 sec, mil | 5.5 | 5.25 |
| tb, 70 sec, mil | 18.25 | 16.75 |
| tb, 80 sec, mil | NA | 16.5 |
| tb, 90 sec, mil | NA | NA |
| Flex strength, .psi | 3274 | 3285 |
| Flex Modulus, kpsi | 126 | 123.7 |
| Izod Impact strength, 23° C. | 12.86 | 14.58 |
| Izod Impact Strength, –30° C. | 1.87 | 2.11 |
| $T_m$, ° C. | 170.3 | 171 |
| $H_m$, mJ/mg | 43.77 | 38.88 |
| $T_c$, ° C. | 131.5 | 131.5 |
| $H_c$, mJ/mg | –70 | –66.5 |

The data from Examples 4–6 in which elastomer but not LCBPP was present led to theory that the azo compound enhanced the rate of PP crystallization and contributed to the formation of a graft bridge between the PP and elastomer. The latter possibility was eliminated in these Examples 13–14 by removing elastomer. The data in Table 10 show that addition of increased amounts of azo over the amounts used in Examples 4–6 and 8–12 decreases crystallinity of PP itself, as indicated by lower $H_m$. While crystallinity is not directly related to melt viscosity, the indication of a decrease in crystallinity based on observed lower $H_m$ is noted to coincide in these Examples 13 and 14 with an increase in melt elasticity and melt viscosity, higher impact strength, lower stiffness, and better thermo-formability. This finding is in sharp contrast to the common effect of adding a peroxide type free radical generator, which tends to increase melt flow rate, decrease melt elasticity and melt viscosity, and increase stiffness while decreasing toughness (impact strength) of PP due to β-scission of the SLPP backbone.

Comparative Examples 15–16

Prior examples 1–14 used a non-thermoset elastomer. Examples 15 and 16 tested the difference in effect from using a thermoset elastomer compared to using an elastomer gel in a moderate molecular weight SLPP and LCBPP TPO composition in the presence of an azo compound.

TABLE 11

Effect of Thermoset Elastomer on SLPP/LCBP Blend

| | Example No | |
|---|---|---|
| | 15 | 16 |
| Thermoset EPDM | 28.5 | 0 |
| Bayer EPDM 8816 | 0 | 28.5 |
| Fortilene 9300, 3–4 MFR | 58.5 | 58.5 |
| Daploy | 13 | 13 |
| Azo (phr of rubber) | 0.25 | 0.25 |
| B225 | 0.2 | 0.2 |
| Sp. Gravity | 0.98 | 0.904 |
| MFR, 2160 gm, 230° C. | 3.51 | 2.48 |
| MFR, 5 kg | 20.84 | 14.98 |
| MFR, 10 kg | 122 | 59 |
| $I_{10/12}$ | 35 | 24 |
| tensile strength, psi | 3293 | 2816 |
| % elongation at yield | 16 | 9 |
| % ultimate Elongation | 51 | 370 |
| tb, 50 sec, mil | tore | 18 |
| tb, 60 sec, mil | tore | 14 |
| tb, 70 sec, mil | tore | 28 |
| tb, 80 sec, mil | tore | 21 |
| tb, 90 sec, mil | tore | 21 |
| Flex strength, .psi | 3580 | 3300 |
| Flex Modulus, kpsi | 127.3 | 122 |
| Tear Strength, psi | 848 | 871 |
| Izod Impact strength, 23° C. | 1.47 | 13.62 |
| Izod Impact Strength, –30° C. | 0.72 | 1.96 |
| Tm, ° C. | 166.9 | |
| Hm, mJ/mg | 67.66 | |
| Tc, ° C. | 132.4 | |
| Hc, mJ/mg | 75.6337 | |

As seen from Table 11, the TPO composition using the already highly cross linked thermoset elastomer had very high melt strengths, could not be stretched, had very low impact strengths, and was not suitable for thermoforming. Thus, the benefits of the instant invention are not achieved by using a thermoset elastomer as an ingredient elastomer in the composition of this invention.

Examples 17–18

These examples compare the effect of adding particulate filler such as talc for increasing melt strength (Example 18) in a high molecular weight SLPP/LCBPP/elastomer/azo composition of this invention. The results are seen in Table 12.

TABLE 12

Effect of Added Particulate Matter on Low MFR TPO Composition

| | Example # | |
|---|---|---|
| | 17 | 18 |
| Bayer EPDM 8816 | 26 | 18.2 |
| Profax 6823 0.8 MFR | 58.7 | 41.1 |
| Daploy | 15.3 | 10.7 |
| Cimpac 710 talc | 0 | 30 |
| Azo (phr of elastomer) | 0.25 | 0.25 |
| B225 | 0.15 | 0.15 |
| Sp. Gravity | 0.91 | 1.045 |
| MFR, 2160 gm, 230° C. | 0.3 | 0.21 |
| MFR, 5 kg | 1.21 | 0.97 |
| MFR, 10 kg | 4.42 | 4.14 |
| $I_{10/12}$ | 14.7 | 19.7 |
| tensile strength, psi | 3150 | 3000 |
| % elongation at yield | 315 | 13 |
| % ultimate Elongation | 350 | 96 |
| Tear Strength, psi | 1080 | 1300 |
| tb, 60 sec, mil | torn | torn |
| tb, 70 sec, mil | torn | torn |
| tb, 80 sec, mil | 23 | torn |
| tb, 90 sec, mil | 26 | torn |
| Flex strength, .psi | 3300 | 4148 |
| Flex Modulus, kpsi | 138 | 220 |
| Izod Impact strength, 23° C. | 14.8 | 11.35 |
| Izod Impact Strength, –30° C. | 2.1 | 1.34 |
| Tm, ° C. | 167 | 167.2 |
| Hm, mJ/mg | 68.5 | 50.51 |
| Tc, ° C. | 130.5 | 129.4 |
| Hc, mJ/mg | 69.51 | 49.4 |

The data in Table 12 illustrate that Talc does increase stiffness and melt strength but reduces draw down and decreases toughness, all while increasing density. A 30% talc filled copolymer of PP is widely used in yogurt tubs and small thin wall thermoformed parts where weight of heated sheet is not critical, and Example 18 demonstrates that the TPO composition of Example 18 can have such applications. However, as a part becomes larger and a wall becomes thicker, this increase in density interferes with thermoforming of such larger, thicker parts. As seen from Example 17, talc or other fillers are not necessary for increasing melt strength, the composition of this invention satisfying that criterion. The results for Example 17 also show that even using the azo compound at one-fourth the strength as in Examples 8–12, the TPO composition of this invention produced the surprising results of this invention.

Comparative Examples 19–20

Examples 19 and 20 set forth the results of using an active peroxide as the free radical generator in a low melt flow SLPP/LCBPP/elastomer composition at half (Example 19) and at equal amounts (Example 20) to the amount of the azo compound in Examples 8–12 and 17. The peroxide was a 20% active concentrate from Polyvel, Inc., used at 0.15% strength (0.03 active solution), equal to 0.125 phr. Table 13 compares those results with the results from Example 17.

Table 13 shows that the peroxide compound, substituted for the azo compound in the composition of this invention, even at half the amount of the azo compound used in Example 17, produces much lower melt strengths, higher melt flow rates and elasticity than the composition of Example 17, all indicative of detrimental β-scission of the PP backbone.

TABLE 13

Effect of Peroxide Compared to Azo in Low MFR Compositions

| | Example No. | | |
|---|---|---|---|
| | 17 | 19 | 20 |
| Bayer EPDM 8816 | 26 | 26 | 26 |
| Profax 6823 0.8 MFR | 58.7 | 58.7 | 58.7 |
| Daploy | 15.3 | 15.3 | 15.3 |
| Active peroxide (phr of batch) | 0 | 0.125 | 0.25 |
| Azo (phr of batch) | 0.25 | 0 | 0 |
| B225 | 0.15 | 0.15 | 0.15 |
| Sp. Gravity | 0.91 | 0.91 | 0.91 |
| MFR, 2160 gm, 230° C. | 0.3 | 1.1 | 2.5 |
| MFR, 5 kg | 1.21 | 3.81 | 9.4 |
| MFR, 10 kg | 4.42 | 11.5 | 24 |
| $I_{10/12}$ | 14.7 | 10.5 | 9.6 |
| tensile strength, psi | 3150 | 2875 | 3020 |
| % elongation at yield | 315 | 229 | 11 |
| % ultimate Elongation | 350 | 363 | 367 |
| Tear Strength, psi | 1080 | 950 | 1020 |
| tb, 60 sec, mil | torn | 7 | tore |
| tb, 70 sec, mil | torn | 20 | 18 |
| tb, 80 sec, mil | 23 | 20 | 21 |
| tb, 90 sec, mil | 26 | 26 | 20 |
| Flex strength, .psi | 3300 | 3290 | 3340 |
| Flex Modulus, kpsi | 138 | 134 | 139 |
| Izod Impact strength, 23° C. | 14.8 | 15.48 | 14.65 |
| Izod Impact Strength, −30° C. | 2.1 | 2.2 | 1.86 |
| Tm, ° C. | 167 | 167.3 | 169.1 |
| Hm, mJ/mg | 68.5 | 70.43 | 69.86 |
| Tc, ° C. | 130.5 | 130.8 | 125.5 |
| Hc, mJ/mg | 69.51 | 56.57 | 69.75 |

Examples 21–23

In these comparative examples the SLPP of the TPO composition is one of moderate molecular weight. These examples compare the results of using substantially the same amounts of free radical generating compound as in Examples 8–12, either as the azo compound alone (Example 21), the active peroxide compound alone (Example 22), or both of them in combination (Example 23). The peroxide was TVC-D40 from Rhine Chemie, a 40% concentrate, used at 0.20% (1 gm for every 500 gm batch, i.e., 0.080 active), or 0.28 phr.

TABLE 15

Effect of Peroxide Compared to Azo in Moderate MFR Composition

| | Example # | | |
|---|---|---|---|
| | 21 | 22 | 23 |
| Bayer EPDM 8816 | 28.5 | 28.5 | 28.5 |
| PP 3–4 MFR | 58.5 | 58.5 | 58.5 |
| Daploy | 13 | 13 | 13 |
| Active peroxide (phr of elastomer) | 0 | 0.28 | 0.28 |
| Azo (phr of elastomer) | 0.25 | 0 | 0.25 |
| B225 | 0.2 | 0.2 | 0.2 |
| Sp. Gravity | 0.904 | 0.9 | 0.9 |
| MFR, 230 C., 2.16 kg | 2.5 | 25.77 | 16.83 |
| Flex strength, .psi | 4000 | 4034 | 3717 |
| Flex Modulus, kpsi | 157 | 159 | 147 |
| Izod Impact strength, 23° C. | 13.16 | 1.34 | 2.3 |
| Izod Impact Strength, −30° C. | 1.95 | 0.67 | 1.1 |
| Tensile Strength, psi | 3100 | 2814 | 2802 |
| % elongation at yield | 15 | 7 | 6 |
| % elongation at break | 315 | 17 | 48 |
| tb, 60 seconds | torn | torn | torn |
| tb, 70 seconds | 16 | torn | 10 |
| tb, 80 seconds | 20 | 15 | 13 |
| tb, 90 seconds | 21 | 35 | 25 |
| Surface texture | smooth | porous | porous |
| Tm, ° C. | 168.2 | 167.9 | 166.8 |
| Hm, mJ/mg | 68.62 | 72.85 | 75.475 |
| Tc, ° C. | 133.3 | 131.2 | 131.3 |
| Hc, mJ/mg | 69.52 | 67.09 | 68.53 |

As compared a TPO composition of this invention using only the azo compound (Example 21) as a free radical generator, the TPO composition of Example 22 using solely a peroxide compound scissions the SLPP excessively, as indicated by the substantially decreased viscosity of the TPO composition of Example 22 (larger MFR of the composition). The reduced viscosity of the composition of Example 22 indicates that melt strength is depressed. The impact strength of Example 22 is unacceptably low for the kind of thermoforming applications for which the TPO compositions of this invention are so well suited.

However, a comparison of Example 23 to Example 22 indicates a very surprising result. Although the properties of the TPO composition using both an azo compound and a peroxide compound are not nearly as good as for the TPO composition of Example 21, the viscosity and impact strength results are better than in Example 22. This suggests that the azo compound may be acting as an effective co-agent in a way that markedly decreases chain scission activity of the peroxide. Accordingly, this invention encompasses the use of a peroxide if and only if the composition includes a requisite azo compound.

Examples 24–26

The elastomer used in Examples 1–12 and 16–23 is, as mentioned prefacing the examples, Buna® 8816 a special grade EPDM terpolymer having a Mooney viscosity of 62, an ENB of 5%, and an ethylene content of 65%. Buna® 8816 is more crystalline than the Buna® EP elastomers used in Examples 24–26 and can be pelletized by a supplier without adding PP. The Buna® EP elastomers used in Examples 24–26 are EP elastomers that have increasing molecular weights, as indicated by Mooney viscosities M70 (Example 24), M80 (Example 25) and M100 (Example 26) but have equal ethylene contents of about 47% ethylene, and negligible ENB. Because of comparatively lower ethylene content the elastomers used in Examples 24–26 are highly amorphous and cannot be pelletized by a supplier without modification. In order to pelletize them, 70% of the EPM was mixed with 30% of a high MFR PP. In the formulations used for Examples 24–26, the amount of PP present takes account of the amount of PP in the EPM pellets by adding to the TPO composition an amount to bring total PP to 58.7%. The first sample was mixed at a feed setting of 1.3; all the rest of the samples had a feed setting of 0.7. The longer residence time in the extruder for the first sample improves impact strength, an effect estimated to be 5–6 at −30°

TABLE 16

TPO Compositions With Variant Elastomers

| | Example | | | |
|---|---|---|---|---|
| | 17 | 24 | 25 | 26 |
| Bayer EPDM 8816 | 26 | | | |
| Buna KA8930-M70 | | 26 | | |
| Buna KA8930-M80 | | | 26 | |
| Buna Ka 8930-M100 | | | | 26 |
| PP in Buna Pellets | 0 | 11.14 | 11.14 | 11.14 |
| Profax 6823 0.8 MFR | 58.7 | 47.56 | 47.56 | 47.56 |
| Daploy | 15.28 | 15.28 | 15.28 | 15.28 |
| Azo (phr of rubber) | 0.25 | 0.25 | 0.25 | 0.25 |
| B225 | 0.15 | 0.15 | 0.15 | 0.15 |
| Sp. Gravity | 0.91 | 0.91 | 0.91 | 0.91 |
| MFR, 2160 gm, 230° C. | 0.3 | 0.75 | 0.8 | 0.82 |
| MFR, 5 kg | 1.21 | 2.8 | 2.9 | 3.13 |
| MFR, 10 kg | 4.42 | 10 | 11 | 14 |
| I10/12 | 14.73 | 13.33 | 13.75 | 17.07 |
| Tensile strength, psi | 3150 | 2975 | 2965 | 3150 |
| % elongation at yield | 315 | 308 | 367 | 10 |
| % ultimate elongation | 350 | 396 | 393 | 368 |
| Tear Strength, psi | 1080 | 1065 | 986 | 1061 |
| tb, 60 sec, mil | torn | 11 | 5 | 14 |
| tb, 70 Sec, mil | torn | 20 | 22 | 22 |
| tb, 80 sec, mil | 23 | 23 | 23 | 25 |
| tb, 90 sec, mil | 26 | 20 | 28 | 26 |
| Flex strength, .psi | 3300 | 3378 | 3113 | 3200 |
| Flex Modulus, kpsi | 138 | 144 | 133 | 138 |
| Izod Impact strength, 23° C. | 14.8 | 13.5 | 14.65 | 15.43 |
| Izod Impact Strength, −30° C. | 2.1 | 8.97 | 10.35 | 10.91 |

As molecular weight (Mooney) of the EPM elastomer component increases, elasticity increases, and as seen from Examples 24–26, melt strength as signified by $I_{10/12}$ increases, although MFR of the TPO composition also increases. Most noticeable is the low temperature impact and thermo-formability. As the elastomer component of then TPO composition becomes less crystalline it becomes a better impact modifier. The low temperature impact for these blends with lower ethylene is higher than for the Buna 8816 based blends. Further, there is not much drop in flex modulus.

From the results set forth in the foregoing examples, it is apparent that inclusion of the azo compound in the TPO composition of this invention does induce some change in the PP component. It is not known whether the azo compound produces grafts between adjacent PP chains or grafts between the elastomer polymer and PP or whether the azo compound simply increases the length of the PP chain, or whether there is another explanation for the apparent change in the PP component. As respects whether the azo compound causes PP chain growth, most Ziegler/Natta polymerization of propylene is terminated by hydrogen quenching, leaving very small amounts of end chain unsaturation that possibly could be affected by the azo compound. It does appear that at the levels of azo compound used, the azo compound does not seem to cause significant cross linking of the elastomer component of the TPO composition, and consequently, that cross linking of the elastomer does not play a large part in producing the improved properties of the TPO composition of the invention. It is certainly possible that in the reactive blending of TPO's of this invention, using a free radical generator that does not significantly degrade the molecular weight of thermoplastics used in the TPO composition of this invention, polyolefin resin grafts onto the elastomer. If so, a possible mechanism would be that carbon-centered radicals are generated on the polyolefin chain itself, followed by addition to the carbon-carbon double bonds present in the elastomer polymer. The more stable backbone tertiary radicals of the polyolefin's used in the TPO compositions of this invention are ideally suited from an energetic standpoint to add to the double bonds in the elastomers used in the TPO composition of this invention. Thus, it is believed that the TPO polyolefin degradation is largely avoided by the use of less energetic, more selective radicals generated from azoalkanes. Avoiding the TPO polyolefin chain breakage provides a TPO product of this invention having improved quality and performance properties.

While data in foregoing examples have set forth experimental information on the best mode contemplated by the inventors in accordance with the patent statutes, the invention is not limited to the particular data but extends to the full scope of the claims appended hereto and the equivalents thereof.

We claim:

1. A thermoplastic olefin composition, comprising:
   a) from more than 50% up to about 90% by weight of polyolefins consisting of:
      1) a substantially linear homopolymer of propylene and
      2) a long chain branched linear homopolymer of propylene,
   b) from about 10% to less than 50% by weight of a cross linkable ethylene α-olefin polymer elastomer, and
   c) a thermally decomposing free radical generating agent comprising at least an azo compound of the general formula $R_1$—N=N—$R_2$ in which $R_1$ and $R_2$ can be the same or different alkane groups, present in an amount not exceeding about 1.0 phr of elastomer,
   wherein the composition is formed by melt blending the components at a temperature sufficient to melt said polyolefins and elastomer and thermally decompose said agent.

2. The process of claim 1 in which said azo compound is present in an amount less than about 0.5 phr of elastomer.

3. The composition of claim 1 in which said agent is an azoalkane.

4. The composition of claim 3 in which said azoalkane is selected from azosilanes, azonitriles, and α-carbonyl azo compounds.

5. The composition of claim 3 in which said azoalkane is selected from the group consisting of 1-cyano-1-(t-butylazo) cyclohexane; 1-(tert-amylazo)-cyclohexanecarbonitrile; 1-(tert-butylazo)-cyclohexanecarbonitrile; 1-(tert-butylazo)-formamide; 1,1'-azo-bis(cyclohexanecarbonitrile); 1,1'-azo-bis-cyclohexane nitrile; 1,1'-azo-bis-cyclopentane nitrile; 2-(tert-butylazo) isobutyronitrile; 2-(tert-butylazo)-2,4-dimethylpentanenitrile; 2-(tert-butylazo)-2-methylbutanenitrile; 2-(tert-butylazo)-4-methoxy-2,4-dimethylpentanenitrile; 2,2'-azobis(2,4-dimethylpentenenitrile); 2,2'-azobis(2-acetoxypropane); 2,2'-azobis(2-ethylpropanimidamide),2HCl; 2,2'-azobis(2-methyl-butanenitrile); azobis(isobutyronitrile); 2,2'-azo-bis-methyl-2-methyl propionate; 2,2'-azo-bis-2-methylpropionitrile; 2,2'-azo-bis-cyclohexyl propionitrile; 2-cyano-2-propylazoformamide; 4-(tert-butylazo)-4-cyanopentanoic acid; 4,4'-azobis(4-cyanopentanoic acid); azo-bis-(N,N'-diethyleneisobutyramidine); azodicarbonamide; N,N'-dichloroazodicarbonamide; and azo dicarboxylic acid diethyl ester.

6. The composition of claim 1 in which said agent comprises a combination of an azo compound and an organic peroxide in which the amount of organic peroxide does not substantially exceed the amount of azo compound.

7. The process of claim 6 in which said organic peroxide is included in said composition in an amount not in excess of about 0.3 phr of said elastomer.

8. The composition of claim 1 in which said elastomer comprises interpolymers and diene modified interpolymers, in either of which at least one monomer is ethylene.

9. The composition of claim 1 in which said elastomer is selected from polymers prepared by polymerizing ethylene with at least one $C_3$–$C_{20}$ comonomer.

10. The composition of claim 1 in which said elastomer is selected from ethylene/propylene copolymers, ethylene/butylenes copolymers, ethylene/hexene-1 copolymers and ethylene/octene copolymers, ethylene/propylene/octene terpolymers, and terpolymers of ethylene, a $C_3$–$C_{20}$ α-olefin and a diene.

11. The composition of claim 10 in which said diene is dicyclopentadiene, 1,4-hexadiene, piperylene or 5-ethylidene-2-norbornene.

12. An article formed from the thermoplastic olefin of claim 1.

13. The article of claim 12 in which the article is thermoformed.

14. The article of claim 12 in which said thermoplastic olefin is extruded into a sheet and the article is thermoformed from said sheet.

15. A thermoplastic composition, comprising from about 45 to 72 weight percent of substantially linear polypropylene; from about 8 to 15 weight percent of long chain branched polypropylene; from about 20 to 40 weight percent of cross linkable elastomer selected from ethylene/propylene copolymers, ethylene/butylenes copolymers,
ethylene/hexene-1 copolymers and ethylene/octene copolymers,
ethylene/propylene/octene terpolymers, and terpolymers of ethylene, a $C_3$–$C_{20}$ α-olefin and a diene; and from about 0.1 to about 1.0 phr of elastomer of at least one thermally decomposing free radical generating agent comprising an azoalkane compound, wherein said composition is formed by melt blending said components at a temperature above the decomposition temperature of said azoalkane.

16. The composition of claim 15 in which said azoalkane compound is selected from azosilanes, azonitriles, and α-carbonyl azo compounds.

17. The composition of claim 15 in which said azoalkane is 1,1'-azobis(cyclohexanecarbonitrile).

18. An article prepared by thermoforming a sheet formed by extruding a thermoplastic olefin of claim 17.

19. Thermoplastic olefin compositions prepared by a process from components comprising:
   a) from about 57 to about 72 percent by weight of substantially linear polypropylene,
   b) from about 8 to about 13 percent by weight of long chain branched polypropylene;
   c) from about 20 to about 30 percent by weight of an elastomer selected from EPDM and EPM elastomers; and
   d) from about 0.1 to about 1.0 phr of elastomer of weight of an azoalkane compound said process comprising reacting the components in a melt under blending conditions at a temperature at least equal to the thermal decomposition temperature of the azoalkane compound.

20. An article prepared by thermoforming a sheet formed by extruding a thermoplastic olefin of claim 19.

* * * * *